(12) United States Patent
Bae

(10) Patent No.: US 11,679,940 B2
(45) Date of Patent: Jun. 20, 2023

(54) FILM PROCESSING SYSTEM

(71) Applicant: NPS CO., LTD., Cheongju-si (KR)

(72) Inventor: Seong Ho Bae, Daejeon (KR)

(73) Assignee: NFS CO., LTD., Cheongju-si (KR)

( * ) Notice: Subject to any disclaimer, the term of this patent is extended or adjusted under 35 U.S.C. 154(b) by 7 days.

(21) Appl. No.: 17/412,610

(22) Filed: Aug. 26, 2021

(65) Prior Publication Data

US 2022/0177234 A1     Jun. 9, 2022

(30) Foreign Application Priority Data

Dec. 7, 2020   (KR) .................. 10-2020-0169422
Aug. 23, 2021   (KR) .................. 10-2021-0110746

(51) Int. Cl.
    *B65G 47/08*     (2006.01)
    *B65G 15/58*     (2006.01)
    *B65G 43/08*     (2006.01)

(52) U.S. Cl.
    CPC ............ *B65G 43/08* (2013.01); *B65G 15/58* (2013.01)

(58) Field of Classification Search
    CPC .... B65G 43/08; B65G 15/58; B65G 21/2027; B65G 21/2026; B65G 2249/00; B65G 47/22; B65G 47/42; B65G 47/57; B65H 15/02; B65H 2301/30–34112
    See application file for complete search history.

(56) References Cited

U.S. PATENT DOCUMENTS

| | | | | | |
|---|---|---|---|---|---|
| 3,222,964 | A | * | 12/1965 | Obenshain | B65H 29/51 83/156 |
| 3,666,078 | A | * | 5/1972 | Biorseth | B65H 29/00 271/186 |
| 4,078,789 | A | * | 3/1978 | Kittredge | B65H 29/60 271/902 |
| 11,247,243 | B2 | * | 2/2022 | Kløverpris | B07C 5/36 |

* cited by examiner

*Primary Examiner* — Michael McCullough
*Assistant Examiner* — Jessica L Burkman
(74) *Attorney, Agent, or Firm* — NKL Law; Jae Youn Kim

(57) ABSTRACT

Proposed is a film processing system including a supply unit configured to supply a film fabric, a cutting unit configured to cut the film fabric and to form a film product by dividing the film fabric, a transfer unit including a classifier configured to selectively guide the film product along any one of a predetermined non-inverted path and an inverted path, an inverter configured to invert the film product guided along the inverted path up and down, and an inspection transfer device configured to transfer the film product delivered from the classifier in a non-inverted state or the film product delivered from the inverter in an inverted state in a predetermined reference direction, and an inspection unit configured to inspect the film product delivered to the inspection transfer device.

14 Claims, 29 Drawing Sheets

FILM PROCESSING SYSTEM

CROSS-REFERENCE TO RELATED APPLICATION

This application claims priority to and the benefit of Korean Patent Application No. 10-2020-0169422, filed on Dec. 7, 2020, and Korean Patent Application No. 10-2021-0110746, filed on Aug. 23, 2021, the disclosure of which is incorporated herein by reference in its entirety.

BACKGROUND

1. Technical Field

The present invention relates to a film processing system.

2. Description of the Related Art

Recently, a display having a large area has been gradually spread in TV and other display fields.

In general, a protective film for protecting a functional film from the outside is attached to one surface of a display film fabric (hereinafter referred to as a "film fabric") for forming a polarizing film product and other display film products (hereinafter referred to as a "film product"), and an adhesive layer for attaching the functional film to a display panel is formed on the other surface opposite to the one surface. A release film for protecting the adhesive layer from the outside is detachably attached to the adhesive layer.

In addition, the film fabric is mainly stored in a roll state of being wound on an unwinder. Thus, the unwinder unwinds and supplies pre-wound film fabric, and the film product is formed by cutting and dividing the film fabric supplied from the unwinder to have an area corresponding to the display panel.

In general, the film fabric is wound on the unwinder with the protective film facing towards the unwinder and the release film facing outward. Accordingly, when the film product is formed by cutting the film fabric supplied from the unwinder on which the film fabric is wound, the film product is placed to position the protective film on the ground and to allow the release film to face the outside.

In this case, due to inspection of the film product and other process reasons, the film product may have to be turned upside down to allow the release film to face the ground. However, when the film product has a large area, it is difficult to smoothly grip the film product and invert it up and down due to the large area and high weight of the film product. Accordingly, conventionally, there is a problem in that damage to the film product occurs, for example, wrinkles, creases, and scratches occur frequently in a process of reversing the film product up and down.

In addition, a film product discharged from a discharge unit of a film processing apparatus for cutting and processing the film fabric is loaded on a loading bogie for loading and transferring the film product. However, when the film product has a large area, there is a problem in that damage to the film product occurs, for example, pushing, wrinkles, creases, and scratches occur frequently due to frictional force between the film product and the loading bogie in a process of loading the film product on the loading bogie.

SUMMARY

Therefore, the present invention has been made in view of the above problems, and it is an object of the present invention to provide a film processing system that is improved to selectively inspect a film product formed by dividing a film fabric in any one state of an inverted state and a non-inverted state.

It is another object of the present invention to provide a film processing system that is improved to prevent damage to a film product from occurring in a process in which the film product is inverted up and down.

It is yet another object of the present invention to provide a film processing system that is improved to prevent damage to a film product in a process of loading the film product on a film tray.

In accordance with the present invention, the above and other objects can be accomplished by the provision of a film processing system including a supply unit configured to supply a film fabric, a cutting unit configured to cut the film fabric and to form a film product by dividing the film fabric, a transfer unit including a classifier configured to selectively guide the film product along any one of a predetermined non-inverted path and an inverted path, an inverter configured to invert the film product guided along the inverted path up and down, and an inspection transfer device configured to transfer the film product delivered from the classifier in a non-inverted state or the film product delivered from the inverter in an inverted state in a predetermined reference direction, and an inspection unit configured to inspect the film product delivered to the inspection transfer device.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Figure 1:
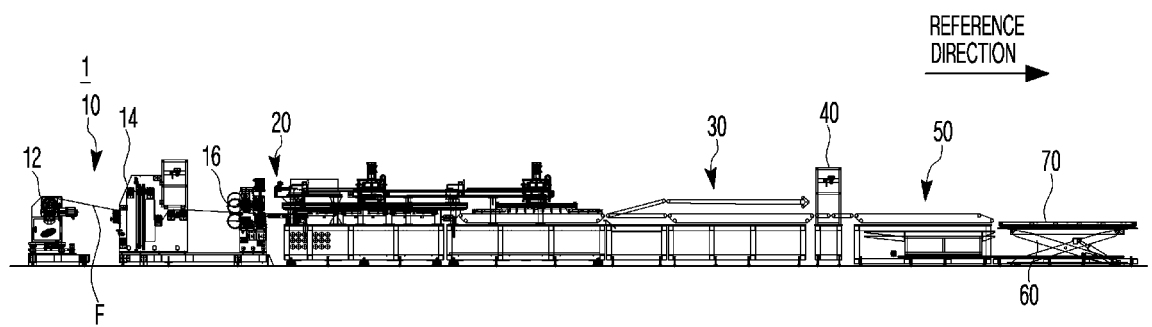
FIG. 1 is a schematic front view showing the configuration of a film processing system according to an embodiment of the present invention.

Hereinafter, the embodiments of the present disclosure will be described in detail with reference to the attached drawings. Here, when reference numerals are applied to constituents illustrated in each drawing, it should be noted that like reference numerals indicate like elements throughout the specification. In addition, in the following description of the present disclosure, a detailed description of known functions and configurations incorporated herein will be omitted when it may make the subject matter of the present disclosure unclear.

In describing the components of the embodiments of the present disclosure, terms such as first, second, A, B, (a), and (b) may be used. These terms are used to distinguish each component from other components, and the nature or order of the components is not limited by these terms. In addition, unless defined otherwise, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic front view showing the configuration of a film processing system according to an embodiment of the present invention.

Referring to FIG. 1, a film processing system 1 according to an embodiment of the present invention may include a supply unit 10 for supplying a film fabric F, a cutting unit 20 for forming a film product P in the form of a sheet having a predetermined area by cutting and dividing the film fabric F, a transfer unit 30 for transferring the film product P along a predetermined transfer path, an inspection unit 40 for inspecting the film product P transferred by the transfer unit 30, a discharge unit 50 for discharging the film product P passing through the transfer unit 30 in a state of being inspected by the inspection unit 40, and a loading bogie 60 for loading the film product P discharged from the discharge unit 50 on a film tray 70.

First, the supply unit 10 may be a device for supplying the film fabric F for forming the film product P.

The supply unit 10 may include a supply roll 12 for unwinding and supplying the film fabric F pre-wound in a roll state, a dancing roller 14 for adjusting tension applied to the film fabric F supplied from the supply roll 12, and a feeding roller 16 for intermittently delivering the film fabric F, tension of which is adjusted by the dancing roller 14, by a predetermined reference length in a predetermined reference direction. Here, the reference direction refers to a direction from the supply unit 10 to the discharge unit 50. The reference length may be determined to be longer than a length L of the film product P by a predetermined margin.

The film fabric F that is intermittently supplied by the feeding roller 16 by a predetermined reference length may be placed on a cutting conveyer 22 of the cutting unit 20 to be described below to be delivered to the cutting unit 20.

Figure 2A:
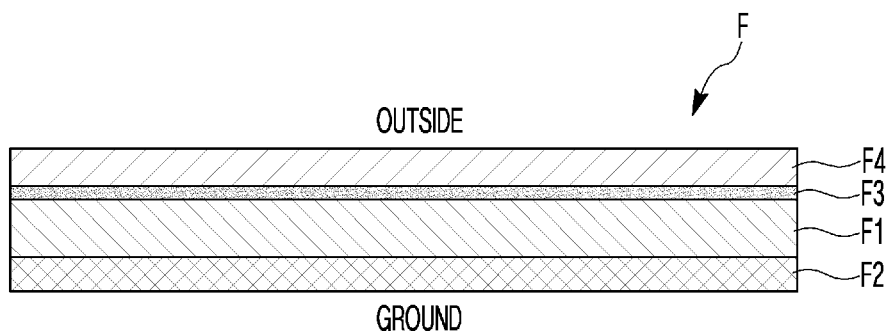
FIGS. 2A and 2B are cross-sectional views of a layered structure of a film fabric.
Figure 2B:
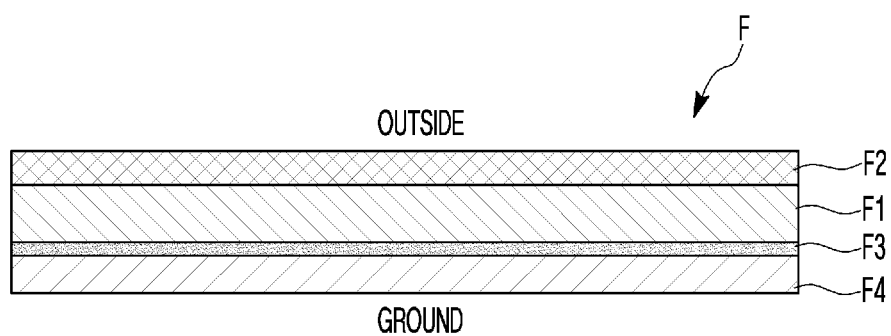

FIGS. 2A and 2B are cross-sectional views of a layered structure of a film fabric.

The type of the film fabric F that is cut and processed using the film processing system 1 is not particularly limited, and the film processing system 1 may cut and process a display film fabric and various other types of film fabrics.

As shown in FIG. 2A, when the film fabric F is a display film fabric, the film fabric F may include a polarizing film, another functional film F1, a protective film F2 stacked on one surface of the functional film F1 to protect the functional film F1, an adhesive layer F3 formed on the other surface of the functional film F1 opposite to the one surface to attach the functional film F1 to a display panel, and a release film F4 detachably attached to the adhesive layer F3 to protect the adhesive layer F3.

When the film fabric F has the aforementioned layered structure, the film fabric F may be wound in a roll state on the supply roll 12 to allow the protective film F2 to face an outer circumference of the supply roll 12 and the release film F4 faces the outside. Then, the film fabric F wound and supplied by the supply roll 12 and the film product P formed by dividing the film fabric F may be disposed to allow the protective film F2 to face the ground and the release film F4 to face the outside. Thus, as shown in FIG. 2A, a non-inverted state of the film product P refers to a state in which the film product P is positioned to allow the protective film F2 to face the ground and the release film F4 to face the outside. As shown in FIG. 2B, a state in which the film product P is upside down refers to a state in which the film product P is positioned to allow the protective film F2 to face the outside and the release film F4 to face the ground.

Figure 3:
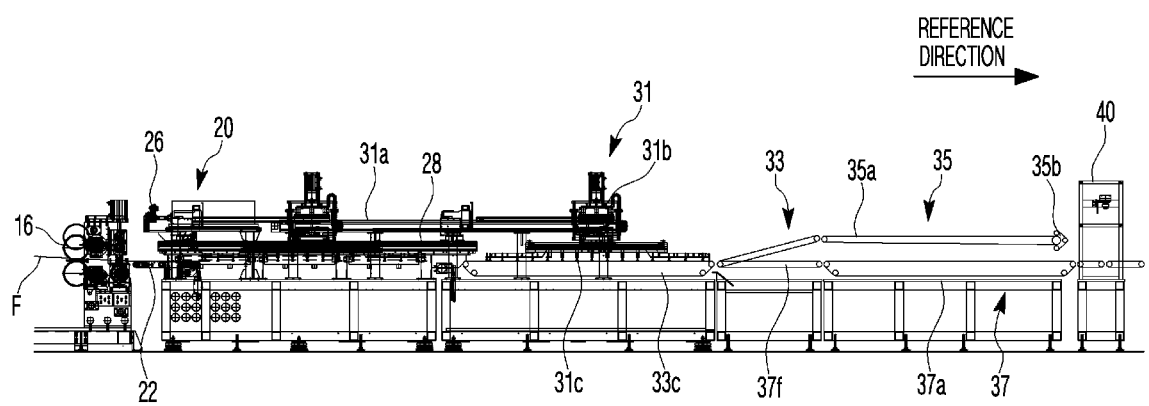
FIG. 3 is a schematic front view showing the configuration of a cutting unit and a transfer unit.
Figure 4:
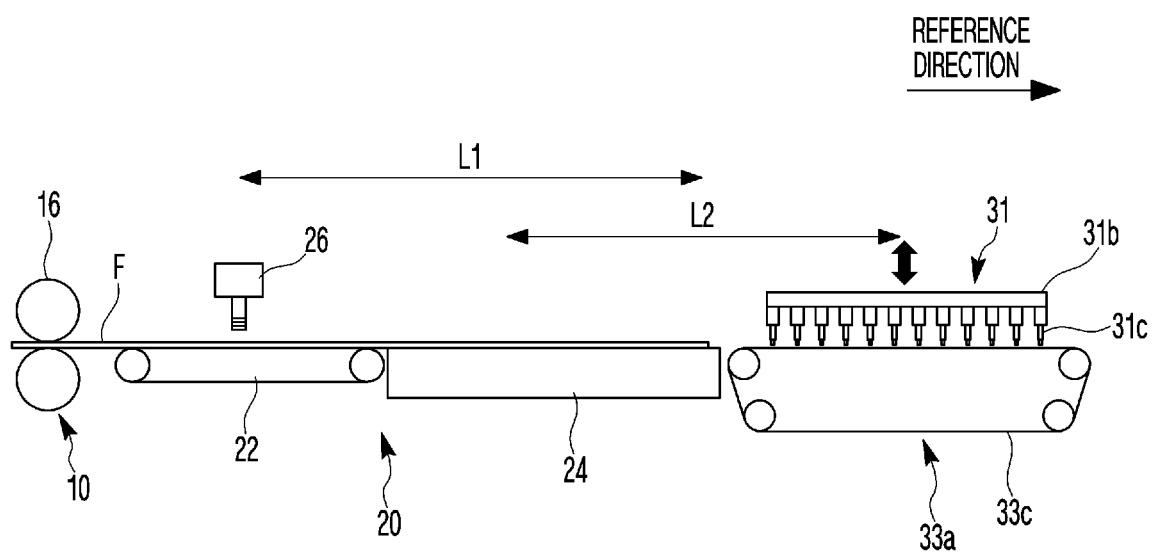
FIGS. 4 to 6 are diagrams for explaining a laser cutting method of a film fabric.
Figure 5:
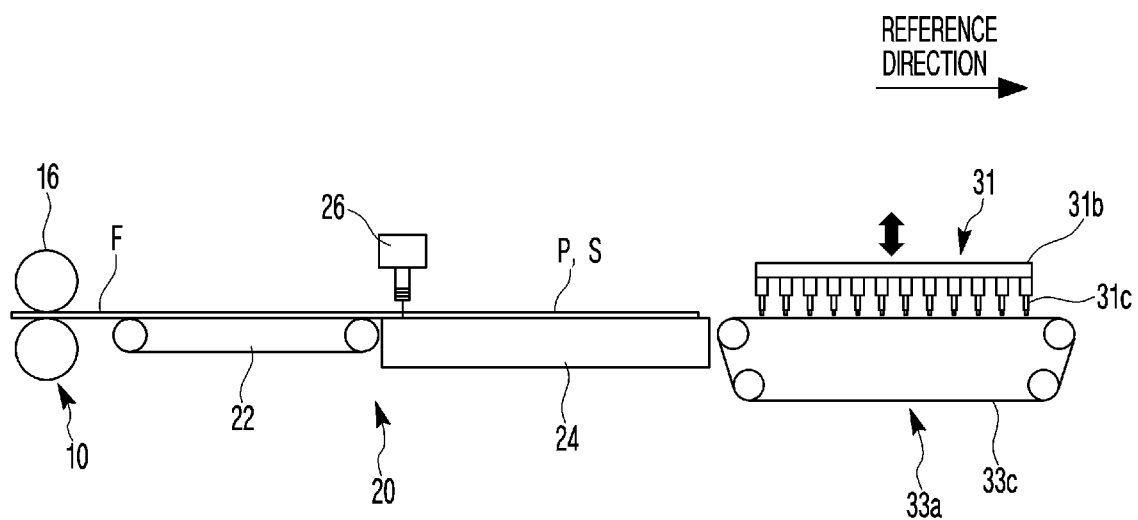
Figure 6:
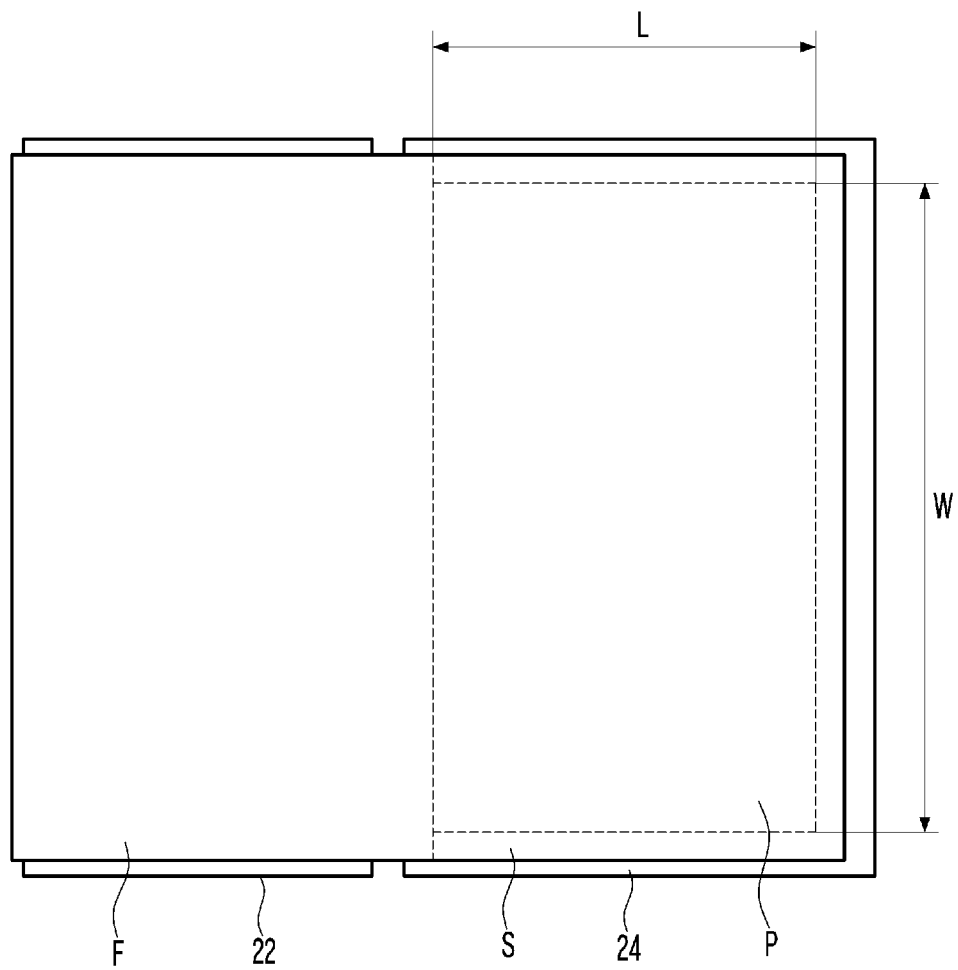
Figure 6:
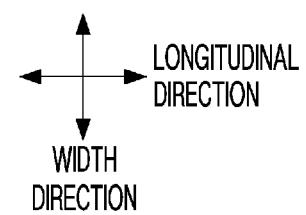
Figure 7:
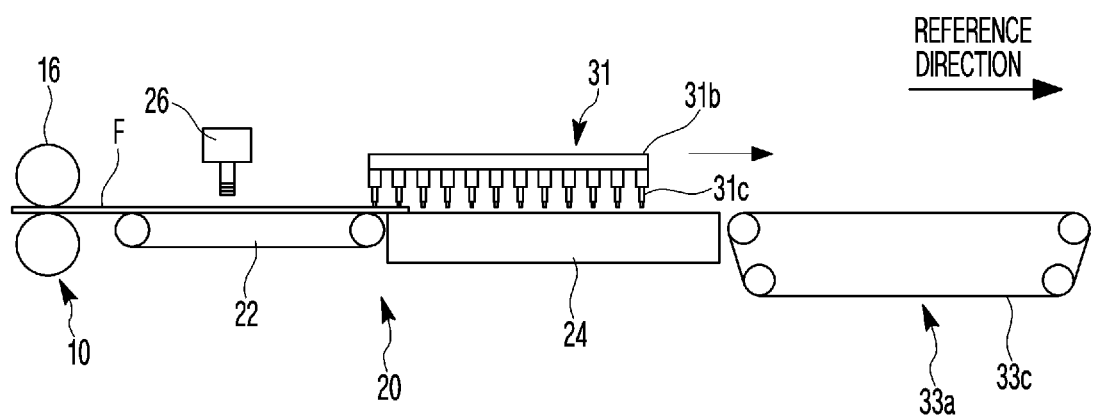
FIG. 7 is a diagram for explaining a method of delivering a film fabric to a worktable using a transfer device.
Figure 8:
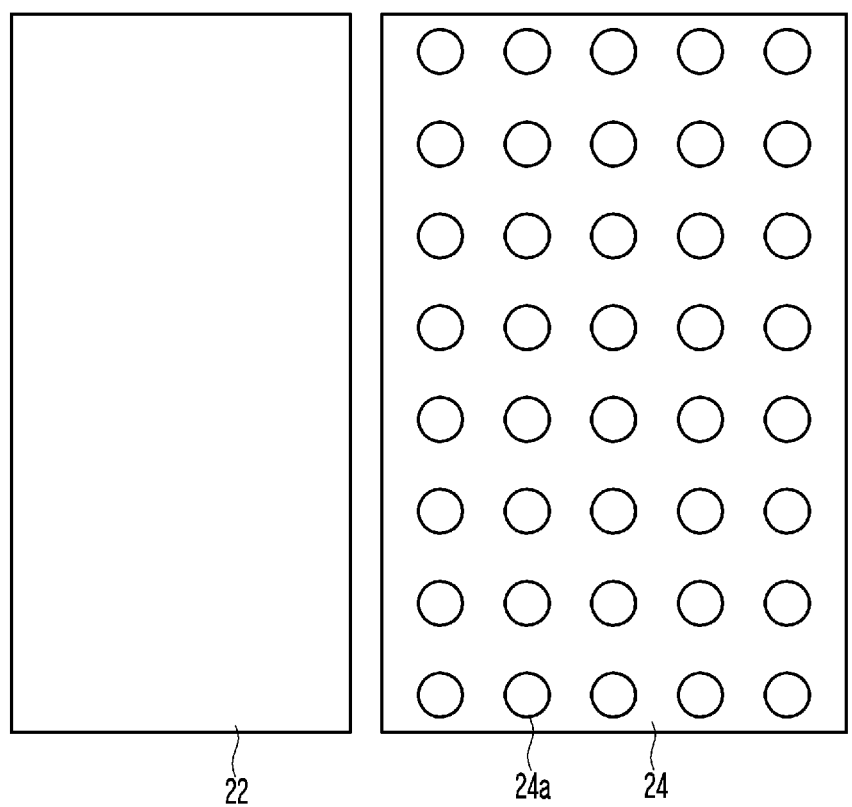
FIG. 8 is a plan view of a worktable.

FIG. 3 is a schematic front view showing the configuration of a cutting unit. FIGS. 4 to 6 are diagrams for explaining a laser cutting method of a film fabric. FIG. 7 is a diagram for explaining a method of delivering a film fabric to a worktable using a transfer device. FIG. 8 is a plan view of a worktable.

Next, the cutting unit 20 may be a device for forming the film product P by cutting and dividing the film fabric F supplied from the supply unit 10.

As shown in FIG. 3, the cutting unit 20 may include the cutting conveyer 22 for transferring the film fabric F supplied from the feeding roller 16 in a reference direction, a worktable 24 on which the film fabric F delivered from the cutting conveyer 22 is placed, a laser oscillator (not shown) for generating and oscillating a laser beam, at least one laser head 26 for irradiating the laser beam oscillated from the laser oscillator to the film fabric F and laser-cutting the film fabric F, and a head driver 28 for transferring the laser head 26 in at least one direction of a longitudinal direction of the film fabric F or a width direction perpendicular thereto to form the film product P by cutting and dividing the film fabric F placed on the worktable 24 along a predetermined cutting path.

As shown in FIG. 4, the cutting conveyer 22 may be installed with a fore-end thereof in contact with the feeding roller 16 to place the film fabric F passing through the feeding roller 16. The cutting conveyer 22 may transfer the film fabric F that is intermittently supplied from the feeding roller 16 by a predetermined reference length in a reference direction and may deliver the film fabric F to the worktable 24.

As shown in FIG. 4, the worktable 24 may be installed between a rear-end of the cutting conveyer 22 and a fore-end of a recovery conveyer 33c to be described below to place the film fabric F passing through the cutting conveyer 22. The worktable 24 may have a predetermined protective structure to avoid being damaged by the laser beam passing through the film fabric F when the film fabric F is laser-cut.

The laser oscillator may be provided to generate and oscillate a laser beam having a wavelength and source suitable for laser-cutting of the film fabric F. The laser head 26 may be provided to focus the laser beam oscillated from the laser oscillator and to irradiate the laser beam to the film fabric F. At least one reflection mirror (not shown) for changing a light path of the laser beam oscillated from the laser oscillator and delivering the laser beam to the laser head 26 may be installed between the laser oscillator and the laser head 26.

The head driver 28 may be provided to transfer the laser head 26 in a longitudinal direction and a width direction of the film fabric F. In particular, the head driver 28 may be provided to transfer the laser head 26 reciprocally along a section L1 between the cutting conveyer 22 and the worktable 24.

The head driver 28 may transfer the laser head 26 along a transfer path corresponding to an outline of the film product P to irradiate the laser beam emitted from the laser head 26 to the film fabric F placed on the worktable 24. As such, as shown in FIGS. 5 and 6, the laser head 26 may laser-cut the film fabric F to form the film product P having a predetermined length L and width W and a scrap S corresponding to a residue after forming the film product P by dividing the film fabric F. In particular, the laser head 26 may laser-cut the film fabric F to form the scrap S to have a 'C' shape surrounding the fore-end and both ends of the film product P, but the present invention is not limited thereto.

However, the worktable 24 may have a structure that is not capable of autonomously transferring the film fabric F, and thus there is concern about damage to the film fabric F due to frictional force between the worktable 24 and the film fabric F in a process in which the film fabric F is delivered to the worktable 24.

To overcome this, as shown in FIG. 7, when the cutting conveyer 22 transfers the film fabric F in a reference direction, a gripper 31b of a transfer device 31 to be described below may grip the fore-end of the film fabric F using a vacuum adsorption pad 31c and may then be moved in the reference direction at the same speed as a film fabric transfer speed of the cutting conveyer 22. As such, the transfer device 31 may effectively reduce frictional force between the film product P and the worktable 24 by dragging the film fabric F toward the worktable 24 and placing the film fabric F on the worktable 24 in conjunction with the cutting conveyer 22.

As shown in FIG. 8, a plurality of guide balls 24a for guiding the film product P and the scrap S may be installed at a predetermined interval on an upper surface of the worktable 24 to allow the film product P and the scrap S to slide along the upper surface of the worktable 24. The guide balls 24a may more effectively reduce the frictional force between the film product P and the worktable 24.

Figure 9:
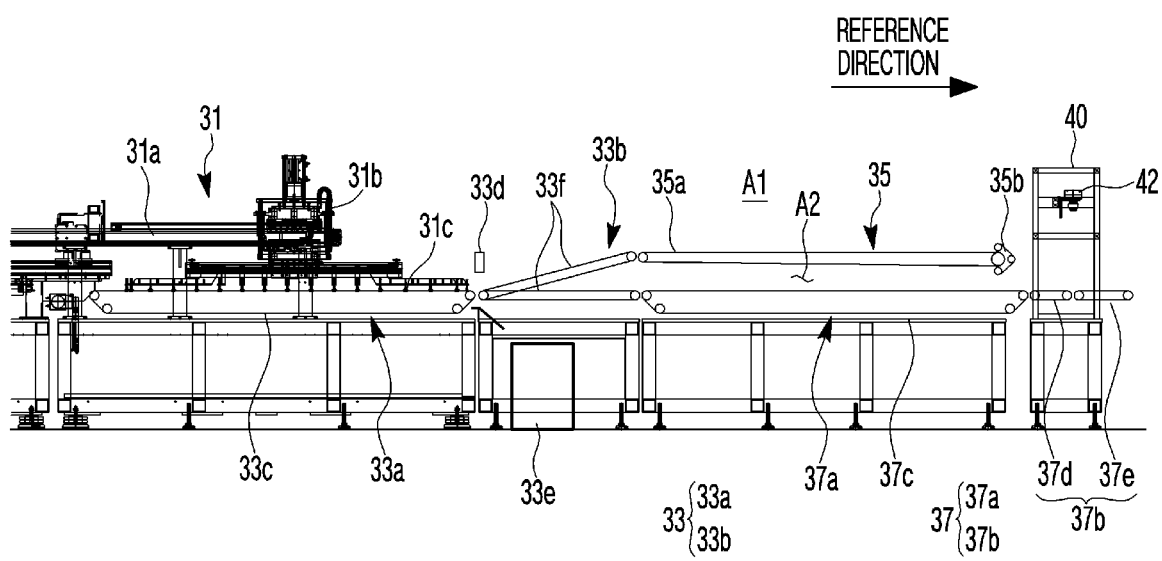
FIG. 9 is a schematic front view of a transfer unit.
Figure 10:
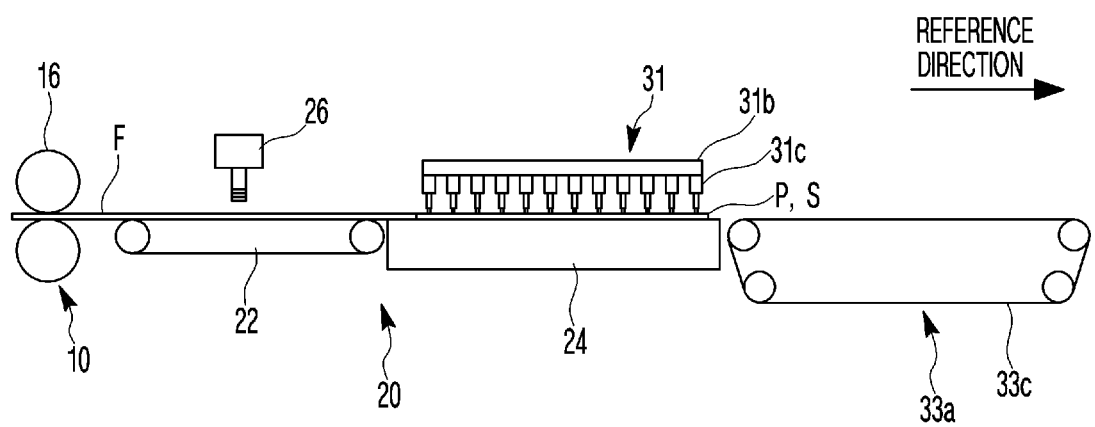
FIGS. 10 and 11 are diagrams for explaining a method of delivering a film fabric to a recovery conveyer using a transfer device.
Figure 11:
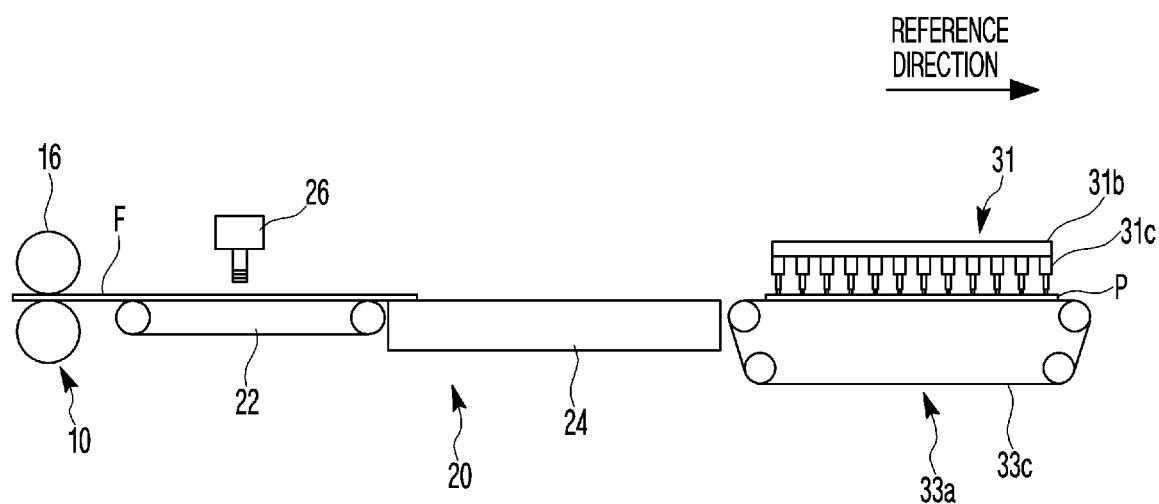
Figure 12:
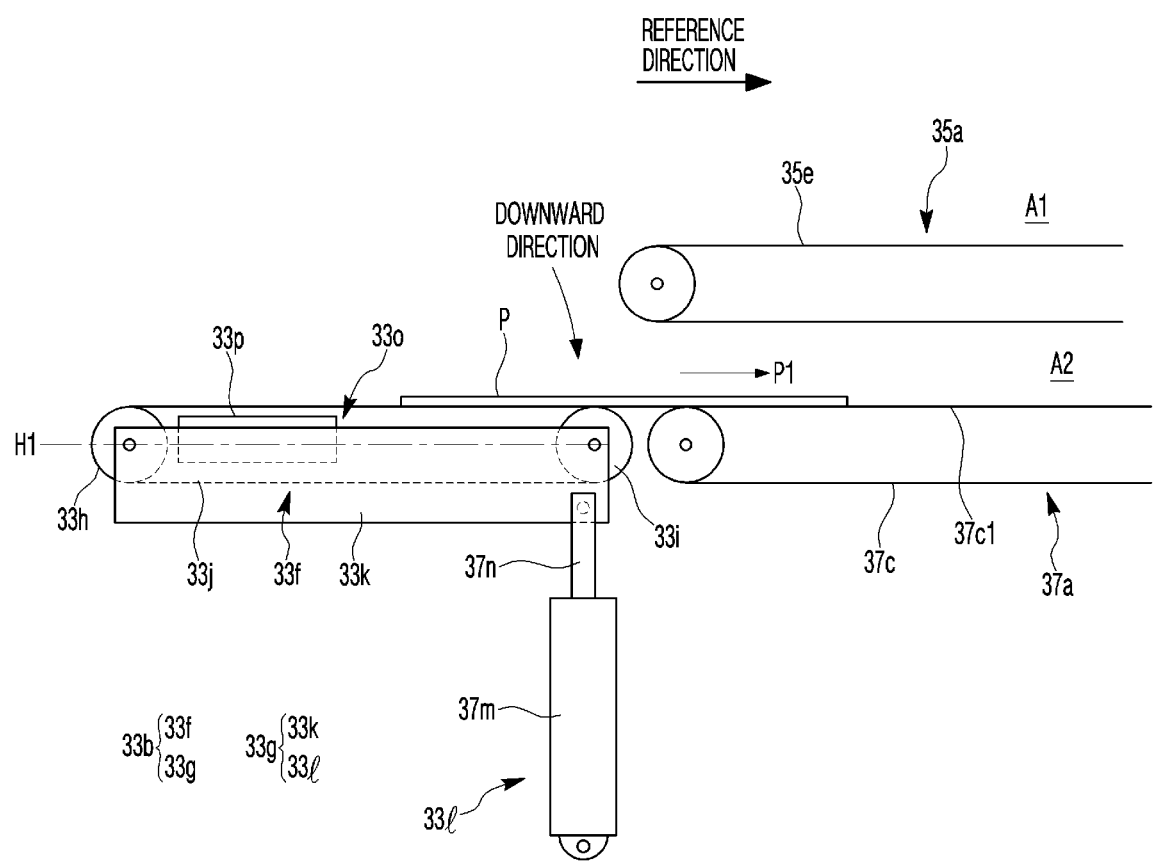
FIG. 12 is a diagram showing an aspect of guiding a film product along a non-inverted path using a classifier.
Figure 13:
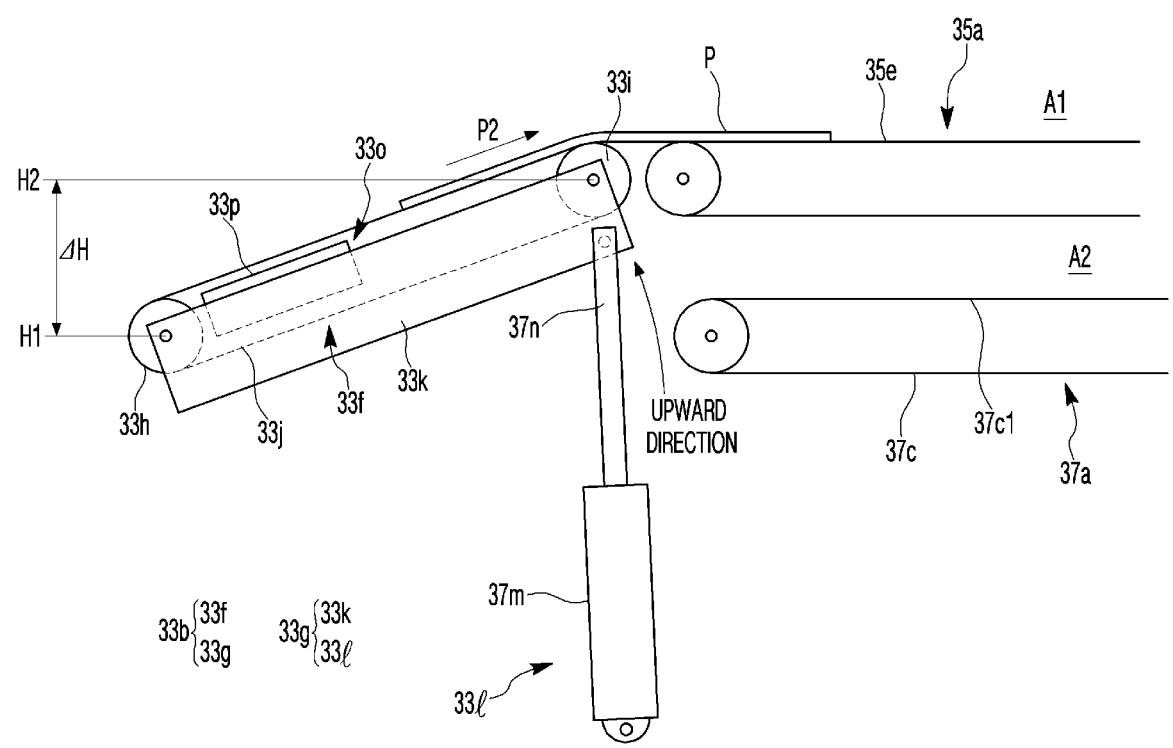
FIG. 13 is a diagram showing an aspect of guiding a film product along an inverted path using a classifier.

FIG. 9 is a schematic front view of a transfer unit. FIGS. 10 and 11 are diagrams for explaining a method of delivering a film fabric to a recovery conveyer using a transfer device. FIG. 12 is a diagram showing an aspect of guiding a film product along a non-inverted path using a classifier. FIG. 13 is a diagram showing an aspect of guiding a film product along an inverted path using a classifier.

Figure 14:
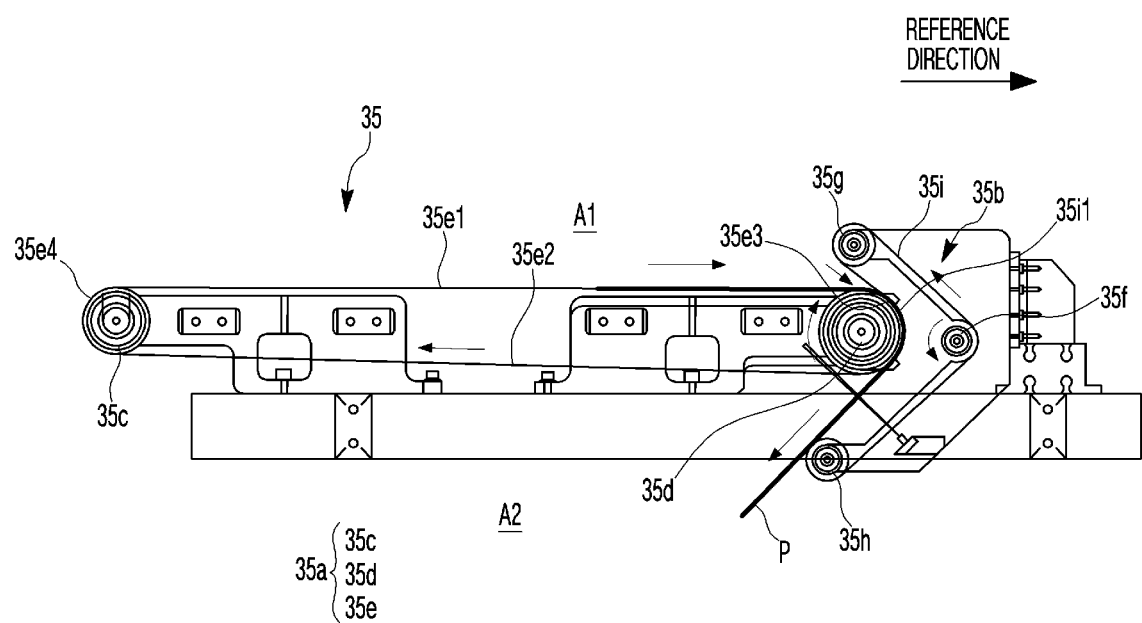
FIG. 14 is a diagram showing an aspect of inverting a film product up and down using an inverter.
Figure 15:
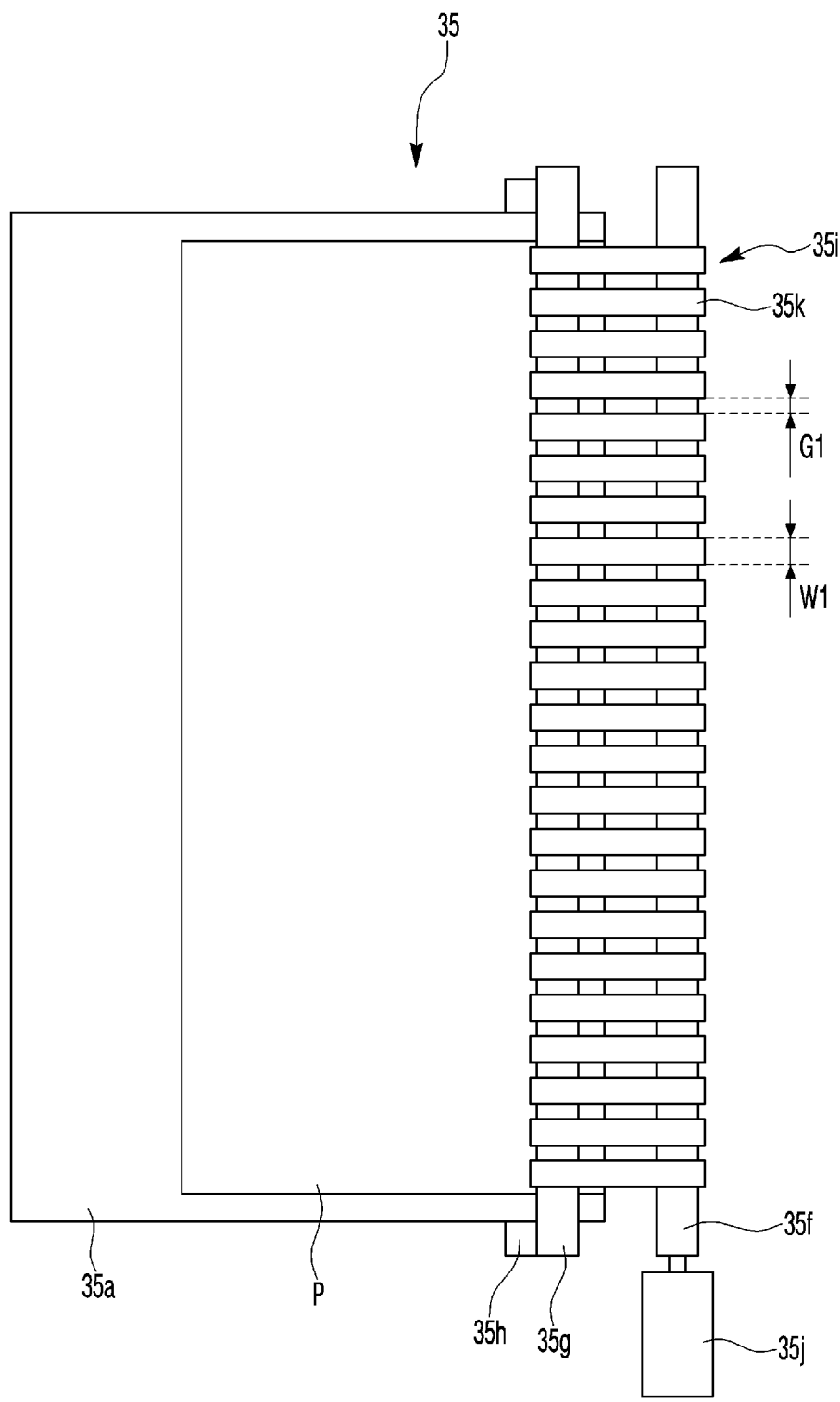
FIG. 15 is a plan view of an inverter.
Figure 16:
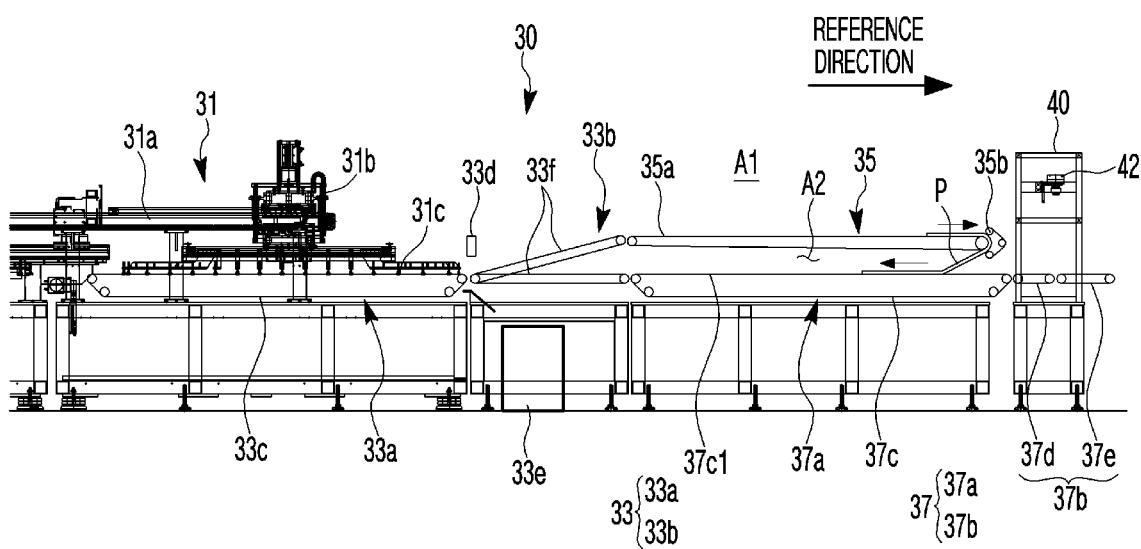
FIG. 16 is a diagram showing an aspect of transferring a film product in an opposite direction to a predetermined reference direction using a two-way conveyor.
Figure 17:
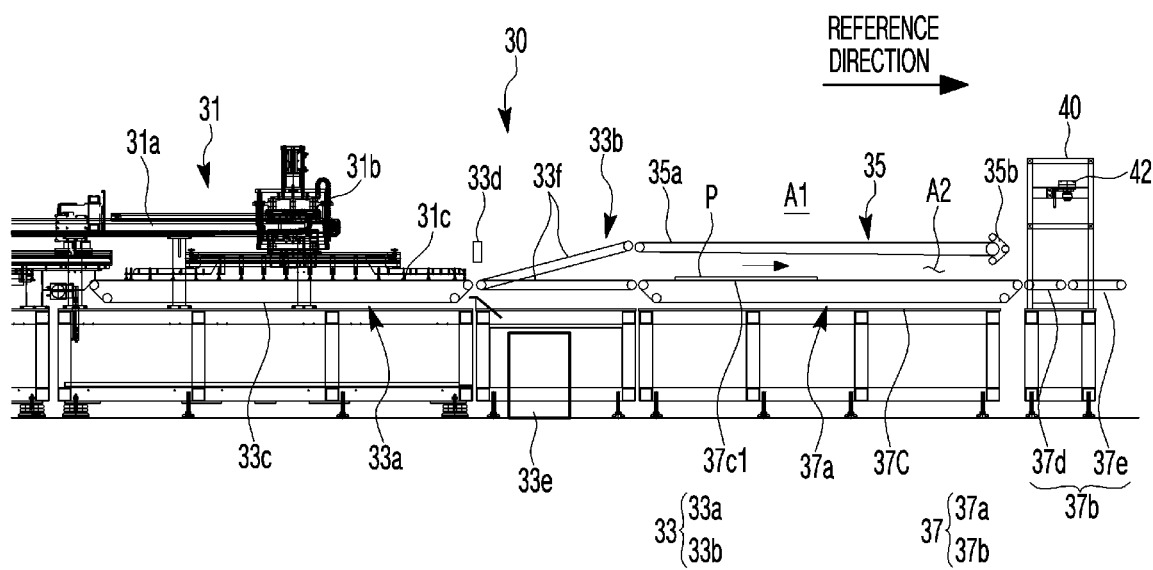
FIG. 17 is a diagram showing a direction of transferring a film product in a predetermined reference direction using a two-way conveyor.
Figure 18:
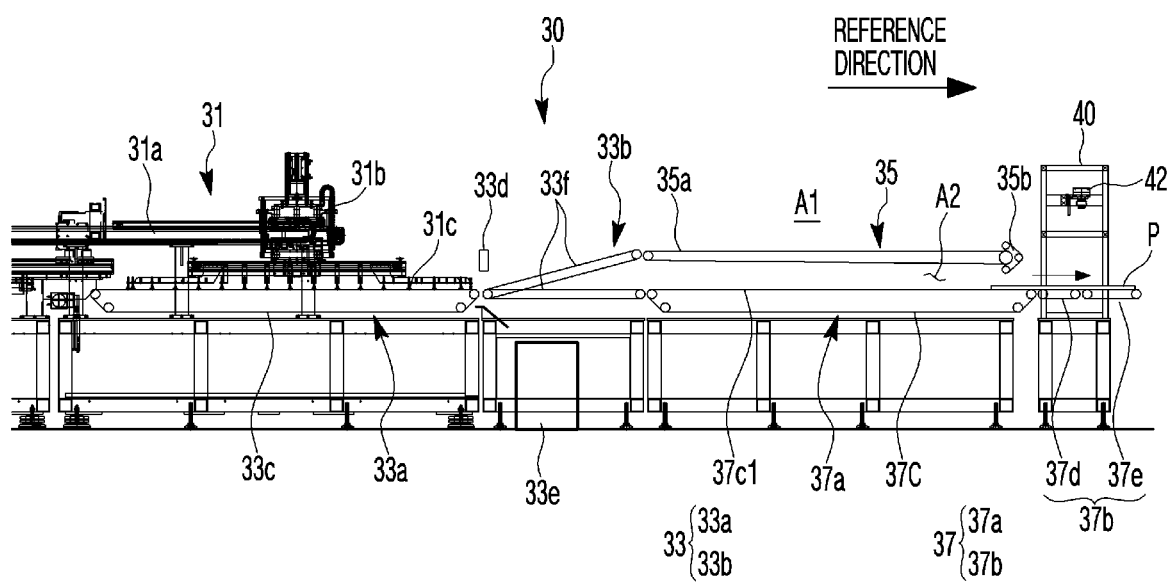
FIG. 18 is a diagram for explaining of method of inspecting a film product using an inspection unit.

FIG. 14 is a diagram showing an aspect of inverting a film product up and down using an inverter. FIG. 15 is a plan view of an inverter. FIG. 16 is a diagram showing an aspect of transferring a film product in an opposite direction to a predetermined reference direction using a two-way conveyer. FIG. 17 is a diagram showing a direction of transferring a film product in a predetermined reference direction using a two-way conveyer. FIG. 18 is a diagram for explaining of method of inspecting a film product using an inspection unit.

Next, the transfer unit 30 is a device for transferring the film product P formed by dividing the film fabric F by the cutting unit 20 along a predetermined transfer path to pass through the inspection unit 40.

As shown in FIG. 9, the transfer unit 30 may include the transfer device 31 for recovering the film product P from the cutting unit 20, a classifier 33 for selectively guiding the film product P delivered from the transfer device 31 along any one of a predetermined non-inverted path P1 and an inverted path P2, an inverter 35 for inverting the film product P delivered from the classifier 33 along the inverted path P2, and an inspection transfer device 37 for transferring the film product P delivered from the inverter 35 in a vertically inverted state or the film product P delivered from the classifier 33 in a non-inverted state to pass through the inspection unit 40.

As shown in FIG. 9, the transfer device 31 may include a rail 31a extending along the section L1 between the worktable 24 and the classifier 33, and the gripper 31b moved reciprocally along the rail 31a and provided to grip and release the film product P and the scrap S. The transfer device 31 may be installed to be spaced apart from the laser head 26, the head driver 28, and various other components included in the cutting unit 20 by a predetermined margin to avoid interfering with the cutting unit 20.

As shown in FIG. 9, the gripper 31b may be installed on the rail 31a to move reciprocally along a section between the worktable 24 and the classifier 33. As shown in FIG. 10, the gripper 31b may include vacuum adsorption pads 31c installed at a predetermined interval to grip the film product P and the scrap S formed on the worktable 24 via vacuum adsorption or to release the film product P and the scrap S via vacuum adsorption release.

As shown in FIGS. 10 and 11, the gripper 31b may deliver the film product P and the scrap S to the recovery conveyer 33c by gripping the film product P and the scrap S from the worktable 24, transferring the film product P and the scrap S to an installation position of the recovery conveyer 33c of a scrap recovering device 33a to be described below, and then, releasing the film product P and the scrap S to be placed on the recovery conveyer 33c.

As shown in FIG. 9, the classifier 33 may include the scrap recovering device 33a for selectively recovering the scrap S among the film product P and the scrap S that are delivered from the transfer device 31, and a classifying conveyer assembly 33b for selectively guiding the film product P passing through the scrap recovering device 33a along any one of the predetermined non-inverted path P1 and the inverted path P2.

As shown in FIG. 9, the scrap recovering device 33a may include the recovery conveyer 33c for transferring the film product P and the scrap S that are delivered from the transfer device 31 in a reference direction, an air gun 33d for dropping the scrap S by spraying air to the scrap S passing through a space through the recovery conveyer 33c and the classifying conveyer assembly 33b to be described below, and a scrap loading box 33e on which the scrap S dropped by the air gun 33d is loaded.

The classifying conveyer assembly 33b may include a classifying conveyer 33f for transferring the film product P supplied from the recovery conveyer 33c in a reference direction, and a conveyer rotator 33g for adjusting a positioning angle of the classifying conveyer 33f by rotating a fore-end of the classifying conveyer 33f using the fore-end as a rotation shaft.

The classifying conveyers 33f may be installed to be spaced apart from the recovery conveyer 33c at a predetermined reference interval. Here, the reference interval may be determined to place the film product P passing through the rear-end of the recovery conveyer 33c on the fore-end of the classifying conveyer 33f and to smoothly drop the scrap S in the space between the rear-end of the recovery conveyer 33c and the fore-end of the classifying conveyer 33f by air sprayed from the air gun 33d.

As shown in FIG. 12, the classifying conveyer 33f may include a first pulley 33h installed at the fore-end, a second pulley 33i installed at the rear-end, and a conveyer belt 33j that is wound around outer circumferences of the first pulley 33h and the second pulley 33i to form a continuous loop and on which the film product P is placed. Any one pulley of the first pulley 33h and the second pulley 33i may be rotationally driven by a driving motor. Then, the conveyer belt 33j may transfer the film product P while being rotationally driven by the one pulley and the other one of the first pulley 33h and the second pulley 33i may be rotationally driven by the conveyer belt 33j.

The configuration of the conveyer rotator 33g is not particularly limited. For example, as shown in FIG. 12, the conveyer rotator 33g may include a support plate 33k having a fore-end to which the first pulley 33h is rotatably coupled and a rear-end to which the second pulley 33i is rotatably coupled, and an ascending/descending member 331 for raising and lowering the second pulley 33i coupled to the rear-end of the support plate 33k and the rear-end of the support plate 33k by rotating the support plate 33k using the fore-end of the support plate 33k as a rotation shaft to change a positioning angle of the support plate 33k. Here, the fore-end of the support plate 33k may be fixed to a predetermined position to avoid being raised and lowered by the ascending/descending member 331.

The configuration of the ascending/descending member 331 is not particularly limited. For example, the ascending/descending member 331 may be configured as a cylinder member. In this case, the ascending/descending member 331 may include a cylinder body 33m rotatably coupled to a bracket and other fixing members (not shown), and a cylinder rod 33n that is reciprocally and straightly moved within a predetermined stroke range by the cylinder body 33m.

One end of the cylinder rod 33n which protrudes out of the cylinder body 33m may be hinged to the rear-end of the support plate 33k. Then, when the cylinder rod 33n is moved in a + stroke direction in which the length of the corresponding cylinder rod 33n protruding out of the cylinder body 33m is increased, the support plate 33k may be rotated using the fore-end as a rotation shaft in a predetermined ascending direction. In contrast, when the cylinder rod 33n is moved in a – stroke direction in which the length of the corresponding cylinder rod 33n protruding out of the cylinder body 33m is reduced, the support plate 33k may be rotated using the fore-end as a rotation shaft in a descending direction opposite to the ascending direction.

However, the fore-end of the support plate 33k may be coupled to the first pulley 33h positioned at the fore-end of the classifying conveyer 33f, and the rear-end of the support plate 33k may be coupled to the second pulley 33i positioned at the rear-end of the classifying conveyer 33f. Thus, when the cylinder rod 33n is moved in the + stroke direction, the classifying conveyer 33f may be rotated by the support plate 33k using the fore-end of the classifying conveyer 33f as a rotation shaft in a predetermined ascending direction. In contrast, when the cylinder rod 33n is moved in a – stroke direction, the classifying conveyer 33f may be rotated by the support plate 33k using the fore-end of the classifying conveyer 33f as a rotation shaft in a descending direction.

The classifying conveyer assembly 33b may be positioned to raise the rear-end of the classifying conveyer 33f and the rear-end of the support plate 33k when the classifying conveyer 33f and the support plate 33k are rotated in an ascending direction and to lower the rear-end of the classifying conveyer 33f and the rear-end of the support plate 33k when the classifying conveyer 33f and the support plate 33k are rotated in a descending direction. As such, the conveyer rotator 33g may raise and lower the rear-end of the classifying conveyer 33f from which the film product P passing through the classifying conveyer 33f is discharged.

As such, as the classifying conveyer assembly 33b is provided, the classifying conveyer 33f may transfer the film product P delivered from the recovery conveyer 33c and may selectively guide the film product P along any one of a predetermined non-inverted path P1 and an inverted path P2. Here, the non-inverted path P1 refers to a transfer path for transferring the film product P to prevent the film product P from passing through the inverter 35 when vertical inversion of the film product P is unnecessary in a process. In contrast, the inverted path P2 refers to a transfer path for transferring the film product P to allow the film product P to pass through the inverter 35 when vertical inversion of the film product P is necessary in the process.

For example, as shown in FIG. 12, in order to guide the film product P along the non-inverted path P1, the conveyer rotator 33g may rotate the classifying conveyer 33f in a predetermined descending direction to lower the rear-end of the classifying conveyer 33f to a predetermined first reference height H1 in contact with a two-way conveyor 37a of the inspection transfer device 37 to be described below. Then, the classifying conveyer 33f may lower the film product P to the first reference height H1 and guide the film product P along the non-inverted path P1, and as such, the film product P guided along the non-inverted path P1 may be directly delivered to the two-way conveyor 37a of the inspection transfer device 37.

For example, as shown in FIG. 13, in order to guide the film product P along the inverted path P2, the conveyer rotator 33g may rotate the classifying conveyer 33f in a predetermined ascending direction to raise the rear-end of the classifying conveyer 33f to a predetermined second reference height H2 in contact with a bypass conveyer 35a of the inverter 35. Then, the classifying conveyer 33f may raise the film product P to the second reference height H2 and guide the film product P along the inverted path P2, and as such, the film product P guided along the inverted path P2 may be delivered to the bypass conveyer 35a.

There may be a predetermined angle difference between a positioning angle of the classifying conveyer 33f when the film product P is guided along the inverted path P2 and a positioning angle of the classifying conveyer 33f when the film product P is guided along the non-inverted path P1. For example, as shown in FIG. 13, when the first reference height H1 is determined as the height of the rear-end of the classifying conveyer 33f when the classifying conveyer 33f is positioned in parallel to the ground, the classifying conveyer 33f may be arranged inclined upwards to determine the second reference height H2 as the height of the rear-end of the classifying conveyer 33f. Then, when the film product P passes through the classifying conveyer 33f arranged inclined upwards, slip may occur between the film product P and the conveyer belt 33*j* by gravity, and there is a risk that the film product P is transferred in a disorderly manner.

To overcome this, the classifier 33 may further include an adhesion member 33*o* for adhering the film product P to the conveyer belt 33*j* to prevent slip between the film product P and the conveyer belt 33*j*.

The configuration of the adhesion member 33*o* is not particularly limited. For example, as shown in FIG. 13, the adhesion member 33*o* may include a suction 33*p* for vacuum adsorbing the film product P to the conveyer belt 33*j*. The suction 33*p* may be installed inside the classifying conveyer 33*f* to face an inner surface of the conveyer belt 33*j*. The suction 33*p* may be fixed to the support plate 33*k*, and the present invention is not limited thereto.

When the suction 33*p* is installed, a plurality of suction holes (not shown) to which vacuum pressure delivered from the suction 33*p* is applied may be formed in the conveyer belt 33*j*. Thus, the film product P passing through the classifying conveyer 33*f* may be vacuum-adsorbed via vacuum pressure applied to the suction holes and may be in contact with an outer surface of the conveyer belt 33*j*, and thus may be transferred according to a predetermined transfer pattern by the classifying conveyer 33*f*.

As shown in FIG. 9, the inverter 35 may include the bypass conveyer 35*a* for transferring the film product P delivered from the classifier 33 in a reference direction, and an inversion member 35*b* for inverting the film product P delivered from the bypass conveyer 35*a* up and down.

As shown in FIG. 13, the bypass conveyer 35*a* may be installed with a fore-end in contact with the rear-end of the classifying conveyer 33*f* raised to the second reference height H2 and may be installed above the two-way conveyer 37*a*.

As shown in FIG. 14, the bypass conveyer 35*a* may include a first pulley 35*c* disposed at a fore-end, a second pulley 35*d* disposed at a rear-end, and a conveyer belt 35*e* that is wound around outer circumferences of the first pulley 35*c* and the second pulley 35*d* to form a continuous loop. In particular, any one of the first pulley 35*c* and the second pulley 35*d* may be a driving pulley and may be axially coupled to a driving motor. Then, the conveyer belt 35*e* may be rotationally driven by the driving pulley according to a continuous loop, and the other one of the first pulley 35*c* and the second pulley 35*d* may be rotationally driven by the conveyer belt 35*e*.

As shown in FIG. 14, when the conveyer belt 35*e* is installed to form the continuous loop, the conveyer belt 35*e* may include a transfer section 35*e*1 extending to the second pulley 35*d* from an upper end of the first pulley 35*c*, a recovery section 35*e*2 extending to a lower end of the first pulley 35*c* from a lower end of the second pulley 35*d* to be symmetrical with the transfer section 35*e*1, a first change section 35*e*3 for connecting an end point of the transfer section 35*e*1 to a starting point of the recovery section 35*e*2 as a curved section wound around the outer circumference of the second pulley 35*d* to have a curvature corresponding to a curvature of the second pulley 35*d*, and a second change section 35*e*4 for connecting an end point of the recovery section 35*e*2 to a starting point of the transfer section 35*e*1 as a curved section wound around the outer circumference of the first pulley 35*c* to have a curvature corresponding to a curvature of the first pulley 35*c*. Thus, the conveyer belt 35*e* may be rotated repeatedly along the continuous loop in the stated order of the transfer section 35*e*1, the first change section 35*e*3, the recovery section 35*e*2, the second change section 35*e*4, and the transfer section 35*e*1.

The bypass conveyer 35*a* may be installed in such a way that an outer surface of the transfer section 35*e*1 faces an opposite direction to a gravity direction, an outer surface of the recovery section 35*e*2 faces the gravity direction, and the film product P guided along the inverted path P2 is placed on the outer surface of the transfer section 35*e*1. Then, the transfer section 35*e*1 may be positioned above the bypass conveyer 35*a*, the recovery section 35*e*2 may be positioned below the bypass conveyer 35*a*, the first change section 35*e*3 may be positioned at the rear-end of the bypass conveyer 35*a*, and the second change section 35*e*4 may be positioned at the fore-end of the bypass conveyer 35*a*.

The bypass conveyer 35*a* may rotationally drive the conveyer belt 35*e* to move a specific portion of the conveyer belt 35*e*, which enters the transfer section 35*e*1, in a reference direction. For example, as shown in FIG. 14, when the reference direction is a right direction, the bypass conveyer 35*a* may rotationally drive the conveyer belt 35*e* clockwise to move a specific portion of the conveyer belt 35*e*, which enters the transfer section 35*e*1, in the reference direction. As such, the transfer section 35*e*1 may transfer the film product P delivered from the classifying conveyer 33*f* in the reference direction and may be delivered to the inversion member 35*b*.

As shown in FIG. 14, when the conveyer belt 35*e* is rotationally driven to move the transfer section 35*e*1 in a reference direction, the specific portion of the conveyer belt 35*e*, which enters the first change section 35*e*3, may be moved along the outer circumference of the second pulley 35*d*, and in this case, a moving direction is gradually changed in the stated order of a reference direction, a downward direction, and an opposite direction of the reference direction, and simultaneously the conveyer belt 35*e* may be inverted up and down. The specific portion of the conveyer belt 35*e*, which enters the recovery section 35*e*2, may be returned to the transfer section 35*e*1 while moving in an opposite direction to the reference direction. The specific portion of the conveyer belt 35*e*, which enters the second change section 35*e*4, may be moved along the outer circumference of the first pulley 35*c*, and in this case, a moving direction is gradually changed in the stated order of an opposite direction of the reference direction, an upward direction, and the reference direction, and simultaneously the conveyer belt 35*e* may be inverted up and down.

As shown in FIG. 9, the bypass conveyer 35*a* may be configured to have a length shorter than the two-way conveyer 37*a* by a predetermined ratio. In this case, the bypass conveyer 35*a* may be disposed with a rear-end facing a middle part of the two-way conveyer 37*a*. Here, the middle part of the two-way conveyer 37*a* may refer to a region of the two-way conveyer 37*a*, positioned between the fore-end and rear-end of the two-way conveyer 37*a*. As such, when the bypass conveyer 35*a* is provided, the film product P passing through the rear-end of the bypass conveyer 35*a* may be placed on the middle part of the two-way conveyer 37*a* in a state of being inverted up and down by the inversion member 35*b*.

The inversion member 35*b* may be provided to invert the film product P up and down while rotating the film product P along some sections of the continuous loop using characteristics whereby the conveyer belt 35*e* is rotated along the continuous loop. To this end, as shown in FIG. 14, the inversion member 35*b* may be provided to adhere the film product P transferred to the rear-end of the bypass conveyer 35*a* along the transfer section 35*e*1 to the outer surface of the first change section 35e3. Then, the film product P may be inverted up and down while being moved along the first change section 35e3 in a state of being adhered to an outer surface of the first change section 35e3 rather than deviating from the conveyer belt 35e at the rear-end of the bypass conveyer 35a, and simultaneously a moving direction may be changed to an opposite direction of a reference direction from the reference direction.

The configuration of the inversion member 35b is not particularly limited. For example, the inversion member 35b may include a driving pulley 35f rotated by a driving motor 35j, a first driven pulley 35g and a second driven pulley 35h that are installed to rotate freely, and an adhesion belt 35i wound around outer circumferences of the driving pulley 35f and the driven pulleys 35g and 35h.

Any one of the driving pulley 35f and the driven pulleys 35g and 35h may be installed to be spaced apart from the first change section 35e3 by a predetermined distanced in the reference direction. The other one of the driving pulley 35f and the driven pulleys 35g and 35h may be installed to be spaced apart from the first change section 35e3 by a predetermined distance in an upward direction. The other one of the driving pulley 35f and the driven pulleys 35g and 35h may be installed to be spaced apart from the first change section 35e3 by a predetermined distance in the downward direction.

Hereinafter, the inversion member 35b will be described based on the case in which the driving pulley 35f is installed to be spaced apart from the first change section 35e3 by a predetermined distance in a horizontal direction, the first driven pulley 35g is installed to be spaced apart from the first change section 35e3 by a predetermined distance in an upward direction, and the second driven pulley 35h is installed to be spaced apart from the first change section 35e3 by a predetermined distance in a downward direction, as shown in FIG. 14.

The adhesion belt 35i may be wound around outer circumferences of the driving pulley 35f and the driven pulleys 35g and 35h to form a continuous loop. As such, the adhesion belt 35i may rotate the driven pulleys 35g and 35h while being rotated by the driving pulley 35f along the continuous loop.

When the inversion member 35b is installed as described above, the driving pulley 35f and the driven pulleys 35g and 35h may be arranged to form a triangle based on the first change section 35e3, and the first change section 35e3 may be disposed between the first driven pulley 35g and the second driven pulley 35h. Then, one section 35i1 of a specific portion of the adhesion belt 35i, which passes between the first driven pulley 35g and the second driven pulley 35h, may be moved in contact with the first change section 35e3. Thus, the one section 35i1 of the adhesion belt 35i, which is moved in contact with the first change section 35e3, is pressurized and is elastically deformed by the first change section 35e3, and thus may be adhered to the first change section 35e3 to surround the outer surface of the first change section 35e3. Hereinafter, the one section 35i1 of the adhesion belt 35i will be referred to as an adhesion section.

The inversion member 35b may be installed to allow an adhesion section 35i1 to surround at least a portion of the first change section 35e3 in three directions of an upward direction, a horizontal direction, and a downward direction. For example, as shown in FIG. 14, the inversion member 35b may be installed to allow the adhesion section 35i1 to surround the first change section 35e3 in the form of a sector with a predetermined arc angle or a semicircle shape while extending to a lower space A2 from an upper space A1 of the bypass conveyer 35a.

When the inversion member 35b is used, the film product P may be transferred to the rear-end of the bypass conveyer 35a along the transfer section 35e1 and may then enter a gap between the first change section 35e3 and the adhesion section 35i1.

However, when a moving speed of the conveyer belt 35e and a moving speed of the adhesion belt 35i are different from each other, the film product P entering the gap between the first change section 35e3 and the adhesion section 35i1 may not be smoothly moved or pushing, wrinkles, other damages may occur in the film product P. To overcome this, the driving motor 35j of the inversion member 35b may rotationally drive the driving pulley 35f in an opposite direction to a rotation direction of the conveyer belt 35e to rotate the adhesion belt 35i in the opposite direction to the rotation direction of the conveyer belt 35e and to move the adhesion belt 35i at the same speed as the moving speed of the conveyer belt 35e. For example, as shown in FIG. 14, when the conveyer belt 35e is rotated clockwise, the driving motor 35j may rotationally drive the driving pulley 35f counterclockwise to rotate the adhesion belt 35i counterclockwise at the same speed as the conveyer belt 35e. As such, the film product P may be inverted up and down while being moved toward the recovery section 35e2 from the transfer section 35e1 along the first change section 35e3 in a state of being elastically pressurized by the adhesion section 35i1 to be adhered to the first change section 35e3, and simultaneously a moving direction may be gradually changed in the stated order of a reference direction, a downward direction, and an opposite direction of the reference direction.

When the film product P passes through a gap between the first change section 35e3 and the adhesion section 35i1 in a state of being inverted up and down, the film product P may be separated from the conveyer belt 35e while elastic pressure of the film product P by the adhesion belt 35i is released. Then, the film product P may be transferred in the opposite direction of the reference direction by the adhesion belt 35i and may then be dropped from the lower end of the inversion member 35b, and thus may be discharged from the inversion member 35b. The film product P discharged from the inversion member 35b may be placed on the middle part of the two-way conveyor 37a positioned below the bypass conveyer 35a while being moved in the opposite direction of the reference direction, and thus may be delivered to the two-way conveyor 37a.

In general, a belt is wound on a pulley with predetermined tension applied thereto. However, due to structural limitations and other causes, the tension applied to the belt increases toward the center of the belt and decreases toward both ends of the belt. That is, the belt wound on the pulley has characteristics that the tension is different for each part. The characteristics of the belt are clearer as the area of the belt is increased to transfer a transfer object having a large area.

Due to the above characteristics of the belt, when the adhesion belt 35i includes only one part having a large area, there is a risk that elastic pressure applied to the film product P by the adhesion belt 35i is different for each part of the film product P. Then, wrinkles and other damages may occur in the film product P due to difference of elastic pressure for each part.

To overcome this, as shown in FIG. 15, the adhesion belt 35i may have a plurality of unit belts 35k configured in a belt shape and disposed at a predetermined interval G1. Each of the unit belts 35*k* may be formed of an elastically deformable material and may have a width W1 equal to or less than a predetermined reference width. Here, the reference width of each of the unit belts 35*k* may be determined such that a tension difference for each part of the unit belt 35*k* is equal to or less than the predetermined reference difference. The unit belts 35*k* may uniformly apply elastic pressure over an entire region of the film product P that enters a gap between the conveyer belt 35*e* and the unit belts 35*k*. The unit belts 35*k* may prevent the film product P from being damaged due to the difference for each part in elastic pressure applied to the film product P, and thus the film product P having a large area may also be smoothly inverted up and down without a risk of being damaged due to the difference of elastic pressure for each part.

As shown in FIG. 16, the inspection transfer device 37 may include the two-way conveyor 37*a* for selectively transferring the film product P delivered from the inverter 35 in a state of being inverted up and down or the film product P delivered from the classifying conveyer 33*f* in a non-inverted state in a reference direction or an opposite direction of the reference direction, and an inspection conveyer 37*b* for transferring the film product P delivered from the two-way conveyor 37*a* in the reference direction and delivering the film product P to the discharge unit 50 to allow the film product P to pass through the inspection unit 40.

The two-way conveyor 37*a* may be installed in the lower space A2 of the bypass conveyer 35*a* in such a way that a fore-end is contact with a rear-end of the classifying conveyer 33*f* disposed at the first reference height H1 and a middle part faces the rear-end of the bypass conveyer 35*a* and the inversion member 35*b*.

The two-way conveyor 37*a* may be driven to selectively transfer the film product P in any one direction of the reference direction and an opposite direction of the reference direction.

For example, as shown in FIG. 16, when the film product P discharged from the inversion member 35*b* in a vertically inverted state begins to be placed on a transfer section 37*c*1 of a conveyer belt 37*c* while being moved in an opposite direction of the reference direction, the two-way conveyor 37*a* may be drive to move the transfer section 37*c*1 in the opposite direction to the reference direction. In this case, the two-way conveyor 37*a* may be driven to move the transfer section 37*c*1 in the opposite direction of the reference direction until an entire region of the film product P discharged from the inversion member 35*b* is delivered to the transfer section 37*c*1.

The two-way conveyor 37*a* may be driven to move the transfer section 37*c*1 in the opposite direction of the reference direction at the same speed at a moving speed at which the film product P is moved in the opposite direction of the reference direction when the film product P discharged from the inversion member 35*b* is delivered to the transfer section 37*c*1. Then, a speed difference between the film product P and the transfer section 37*c*1 may be 0. As such, the two-way conveyor 37*a* may receive the film product P in a state in which frictional force between the conveyer belt 37*c* and the film product P is minimized, and thus pushing, wrinkles, and other damages may be prevented from occurring in the film product P in a process of delivering the film product P.

As shown in FIG. 17, when the entire region of the film product P is completely delivered from the inversion member 35*b*, the two-way conveyor 37*a* may transfer the film product P in the reference direction and may then deliver the film product P to the inspection conveyer 37*b*.

When the classifying conveyer 33*f* guides the film product P along the non-inverted path P1, the film product P discharged from the classifying conveyer 33*f* may be delivered to the two-way conveyor 37*a* while being moved in the reference direction in a non-inverted state. In this case, as shown in FIG. 17, the two-way conveyor 37*a* may be driven to move the transfer section 37*c*1 in the reference direction at the same speed as the moving speed at which the film product P is moved in the reference direction. As such, the two-way conveyor 37*a* may transfer the film product P delivered from the classifying conveyer 33*f* in the reference direction and may then deliver the film product P to the inspection conveyer 37*b*.

The configuration of the inspection conveyer 37*b* is not particularly limited. For example, as shown in FIG. 18, the inspection conveyer 37*b* may include a first inspection conveyer 37*d* for transferring the film product P delivered from the two-way conveyor 37*a* to an installation position of the inspection unit 40 in the reference direction, and a second inspection conveyer 37*e* for transferring the film product P delivered from the first inspection conveyer 37*d* in the reference direction and delivering the film product P to the discharge unit 50.

The first inspection conveyer 37*d* may be installed with a fore-end in contact with a rear-end of the two-way conveyor 37*a*. In contrast, the second inspection conveyer 37*e* may be installed with a fore-end in contact with a rear-end of the first inspection conveyer 37*d*. In particular, each of the first inspection conveyer 37*d* and the second inspection conveyer 37*e* may be installed to allow a space between the corresponding first inspection conveyer 37*d* and the second inspection conveyer 37*e* to face the inspection unit 40. The first inspection conveyer 37*d* and the second inspection conveyer 37*e* may transfer the film product P delivered from the two-way conveyor 37*a* and may deliver the film product P to the discharge unit 50 to allow the film product P to pass through the inspection unit 40.

Next, the inspection unit 40 may be a device for inspecting the film product P transferred by the transfer unit 30 in real time.

The configuration of the inspection unit 40 is not particularly limited. For example, as shown in FIG. 18, the inspection unit 40 may include a camera 42 for photographing the film product P passing through a space between the first inspection conveyer 37*d* and the second inspection conveyer 37*e* of the inspection transfer device 37, and an analyzer (not shown) for inspecting the state of the film product P by analyzing a captured image of the film product P photographed by the camera 42.

The camera 42 may be installed in an upper space of the inspection conveyer 37*b* to face the space between the first inspection conveyer 37*d* and the second inspection conveyer 37*e*. As such, the camera 42 may photograph an upper surface of the film product P passing through the space between the first inspection conveyer 37*d* and the second inspection conveyer 37*e*.

However, the film product P in a vertically inverted state or the film product P in a non-inverted state may be selectively delivered to the inspection conveyer 37*b*. Thus, when the film product P in a vertically inverted state is delivered to the inspection conveyer 37*b*, the image of the upper surface of the film product P may include image data of the protective film F2. In addition, when the film product P in a non-inverted state is delivered to the inspection conveyer 37*b*, the image of the upper surface of the film product P may include image data of the release film F4.

The analyzer may inspect the film product P by analyzing the image of the upper surface of the film product P delivered from the camera 42. For example, when the film product P in a vertically inverted state is delivered to the inspection conveyer 37b, the analyzer may inspect the protective film F2 by analyzing the image data of the protective film F2 included in the image of the film product P. For example, the film product P in a non-inverted state is delivered to the inspection conveyer 37b, the analyzer may inspect the release film F4 by analyzing the image of the film product P.

Figure 19:
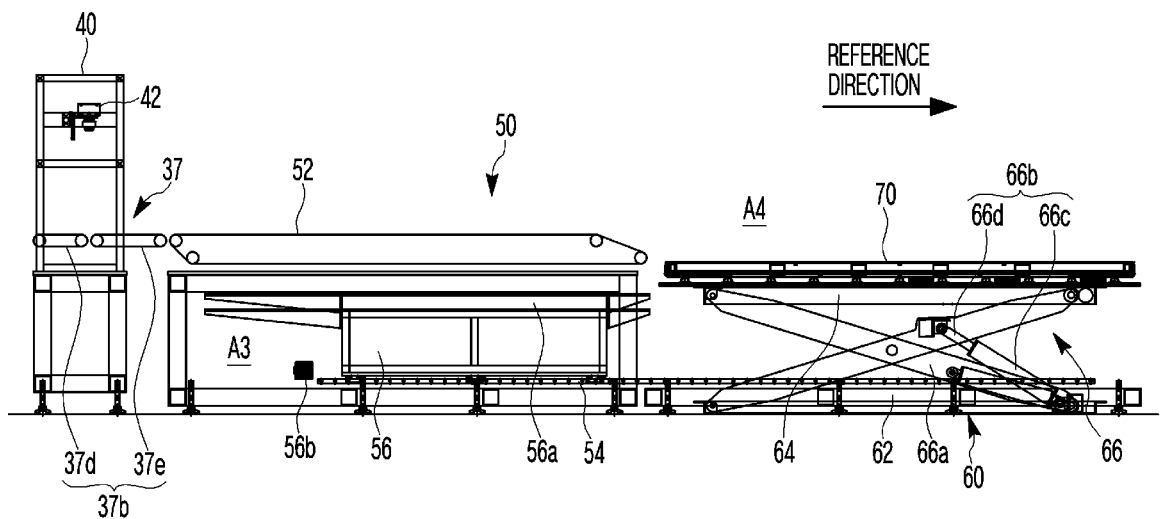
FIG. 19 is a schematic front view of the configuration of a discharge unit and a loading bogie.
Figure 20:
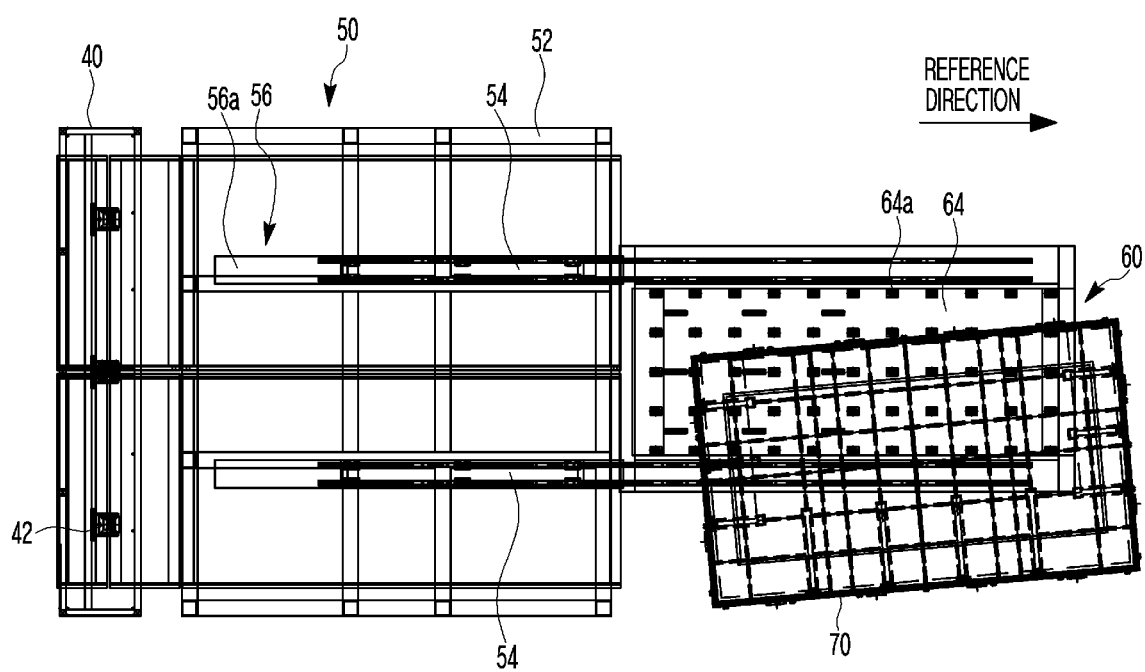
FIG. 20 is a plan view of a loading bogie of a discharge unit.

FIG. 19 is a schematic front view of the configuration of a discharge unit and a loading bogie. FIG. 20 is a plan view of a loading bogie of a discharge unit.

Next, the discharge unit 50 is a device for discharging the film product P delivered from the transfer unit 30 to be loaded on the loading bogie 60 in a state in which the film product P is inspected by the inspection unit 40.

As shown in FIG. 19, the discharge unit 50 may include a discharge conveyer 52 for transferring the film product P delivered from the second inspection conveyer 37e in the reference direction, a rail 54 installed to extend in the reference direction to a rear space A4 of the discharge conveyer 52 from a lower space A3 of the discharge conveyer 52, and an auxiliary bogie 56 installed on the rail 54 to be moved in the reference direction or an opposite direction of the reference direction. Here, the rear space A4 of the discharge conveyer 52 refers to a space positioned to be spaced apart from the rear-end of the discharge conveyer 52 in the reference direction.

The discharge conveyer 52 may be installed with a fore-end in contact with the rear-end of the second inspection conveyer 37e. Thus, the discharge conveyer 52 may transfer the film product P delivered from the second inspection conveyer 37e in the reference direction and may discharge the film product P to be loaded on the film tray 70. Here, the film tray 70 may be a member for loading the film product P discharged from the discharge conveyer 52 and may be formed to have a length and wider larger than the length L and the width W of the film product P by a predetermined ratio.

The rail 54 may be positioned with a fore-end positioned in the lower space A3 of the discharge conveyer 52 and a rear-end positioned in the rear space A4 of the discharge conveyer 52. That is, the rail 54 may be installed with a portion disposed in the lower space A3 of the discharge conveyer 52 and the other portion disposed in the rear space A4 of the discharge conveyer 52.

The number of installations of the rail 54 is not particularly limited. For example, a pair of rails 54 may be installed at a predetermined installation interval.

The auxiliary bogie 56 may be installed on the rail 54 to be moved reciprocally in the reference direction or the opposite direction of the reference direction.

The auxiliary bogie 56 may be configured to have a lower height than the installation height of the discharge conveyer 52 to be inserted into the lower space A3 of the discharge conveyer 52. In particular, the height of the auxiliary bogie 56 may be adjusted, but the present invention is not limited thereto. The auxiliary bogie 56 may be moved reciprocally in a space between the lower space A3 and the rear space A4 of the discharge conveyer 52 along the rail 54.

The number of installations of the auxiliary bogie 56 is not particularly limited. For example, when the pair of rails 54 is installed, the pair of auxiliary bogies 56 may be installed on any one of the rails 54.

The auxiliary bogie 56 may include a support 56a for supporting the film tray 70, and a driving member 56b for automatically driving the corresponding auxiliary bogie 56 along the rail 54. The driving member 56b may include various types of members for automatically driving a driving motor, and other auxiliary bogies 56 along the rail 54.

The support 56a may have a shape corresponding to the film tray 70 in order to place the film tray 70 on an upper surface. For example, when the pair of auxiliary bogies 56 is installed, the supports 56a of the auxiliary bogies 56 may each have a rod shape for suspending the film tray 70.

The case in which the auxiliary bogie 56 is automatically driven along the rail 54 has been described, but the present invention is not limited thereto. That is, the auxiliary bogie 56 may also be arranged to travel along the rail 54 manually by an operator.

Next, the loading bogie 60 may be a device for loading the film product P discharged from the discharge unit 50 on the film tray 70.

As shown in FIG. 19, the loading bogie 60 may include a base plate 62 supported by the ground, a support plate 64 for supporting the film tray 70, and a lift 66 for raising and lowering the support plate 64.

As shown in FIG. 20, the loading bogie 60 may be configured to have a width smaller than an installation interval of the rails 54. As such, the loading bogie may be disposed in the rear space A4 of the discharge conveyer 52 to be positioned between the rail 54.

The base plate 62 may be installed at the lower end of the discharge unit 50 to be supported by the ground. The base plate 62 may include a fixing member (not shown) for fixing the loading bogie 60 to the ground, and a wheel (not shown) for transferring the loading bogie 60 along the ground.

As shown in FIG. 20, the support plate 64 may have an area corresponding to the film tray 70 to place the film tray 70 an upper surface. The support plate 64 may include a plurality of guide balls 64a installed on the upper surface at a predetermined interval to allow the film tray 70 to slide along the upper surface of the support plate 64. The guide balls 64a may guide the film tray 70 to place the film tray 70 at a predetermined position of the support plate 64 or recover the film tray 70 from the support plate 64.

The lift 66 may be provided to position the upper surface of the support plate 64 higher than the upper surface of the support 56a of the auxiliary bogie 56 when the support plate 64 is raised to the maximum height, and to position the upper surface of the support plate 64 lower than the upper surface of the support 56a of the auxiliary bogie 56 when the support plate 64 is lowered to the minimum height.

For example, as shown in FIG. 19, the lift 66 may include a pair of lifting arms 66a that has central portions hinged to each other to cross in the form of X, lower ends hinged to the base plate 62, and upper ends hinged to the support plate 64, and a cylinder member 66b for raising and lowering any one of the lifting arms 66a to raise and lower the support plate 64 while an intersection angle of the lifting arms 66a is changed.

The cylinder member 66b may include a cylinder body 66c hinged to the base plate 62, and a cylinder rod 66d that is reciprocally and straightly moved within a predetermined stroke range by the cylinder body 66c and has an end hinged to any one of the lifting arms 66a. Thus, when the cylinder member 66b is driven to move the cylinder rod 66d in a + stroke direction, the support plate 64 may be raised while the lifting arms 66a are positioned upright as the intersection angle of the lifting arms 66a is reduced. When the cylinder member 66b is driven to move the cylinder rod 66d in a − stroke direction, the support plate 64 may be lowered while the lifting arms 66a lays down as the intersection angle of the lifting arms 66a is increased.

FIGS. 21 to 29 are state diagrams of a discharge unit and a loading bogie showing a process of loading a film fabric on a loading bogie.

Hereinafter, a method of loading the film product P on the film tray 70 using the discharge unit 50 and the loading bogie 60 will be described.

Figure 21:
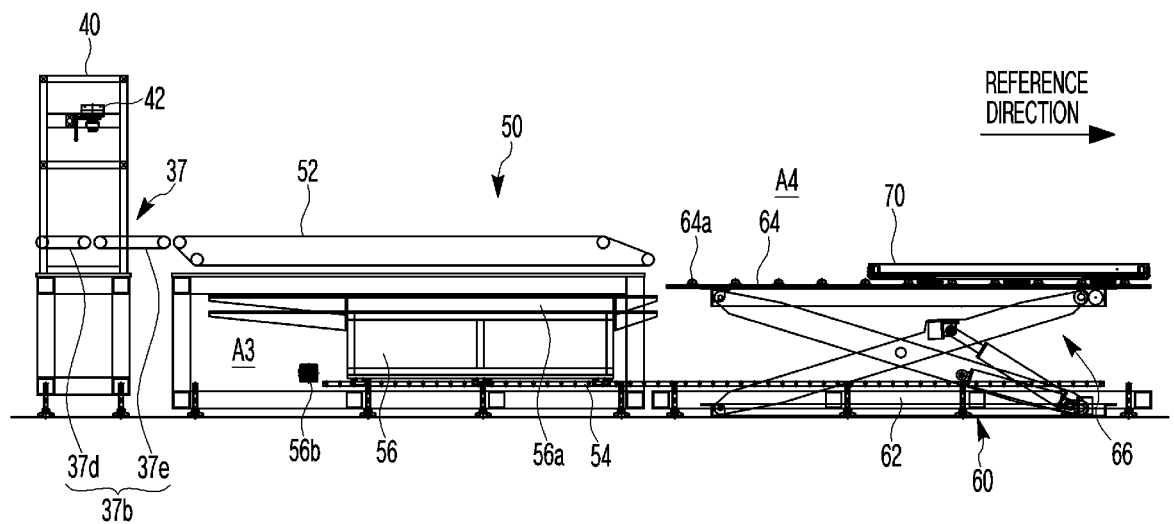
FIGS. 21 to 29 are state diagrams of a discharge unit and a loading bogie showing a process of loading a film fabric on a loading bogie.

First, as shown in FIG. 21, in the state in which the auxiliary bogies 56 are positioned in the lower space A3 of the discharge conveyer 52, the loading bogie 60 may be disposed in the rear space A4 of the discharge conveyer 52 to be positioned between the rails 54.

Figure 22:
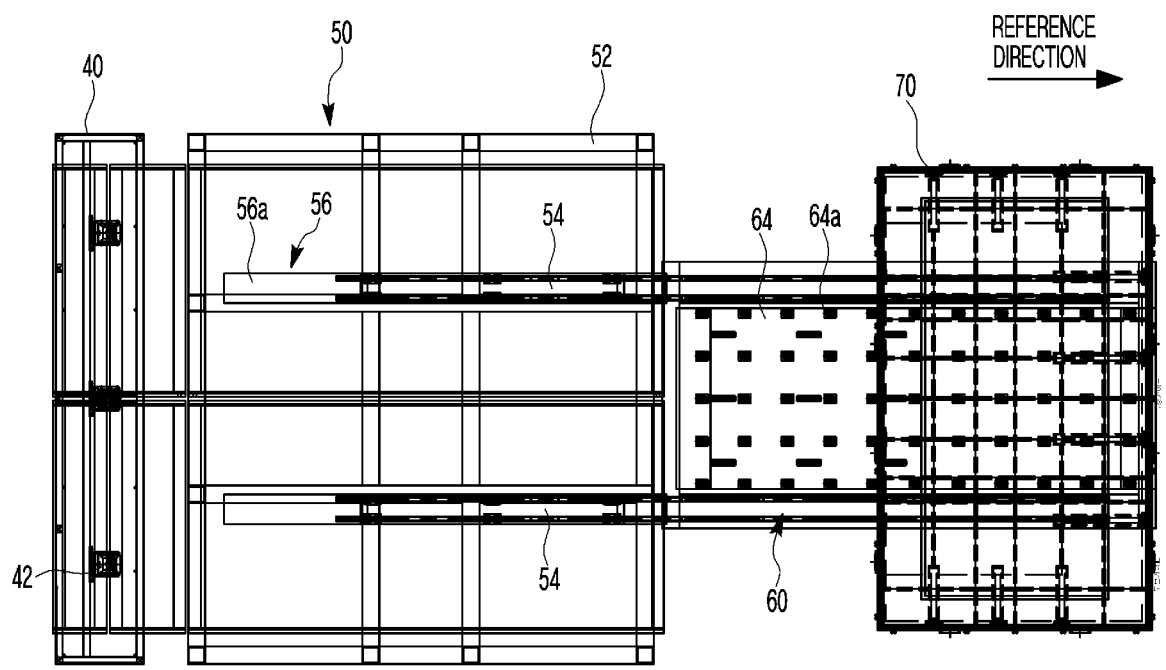

Then, as shown in FIG. 22, the film tray 70 may be placed on the support plate 64 of the loading bogie 60. In this case, the film tray 70 may be placed on the support plate 64 in a predetermined aligning form to place an entire area of the film product P discharged from the discharge conveyer 52 on the film tray 70.

Then, the lift 66 may be driven to raise the support plate 64 to position the upper surface of the support plate 64 higher than the upper surface of the supports 56a of the auxiliary bogies 56. However, the present invention is not limited thereto, and the film tray 70 may also pre-raise the support plate 64 before being placed on the support plate 64.

Figure 23:
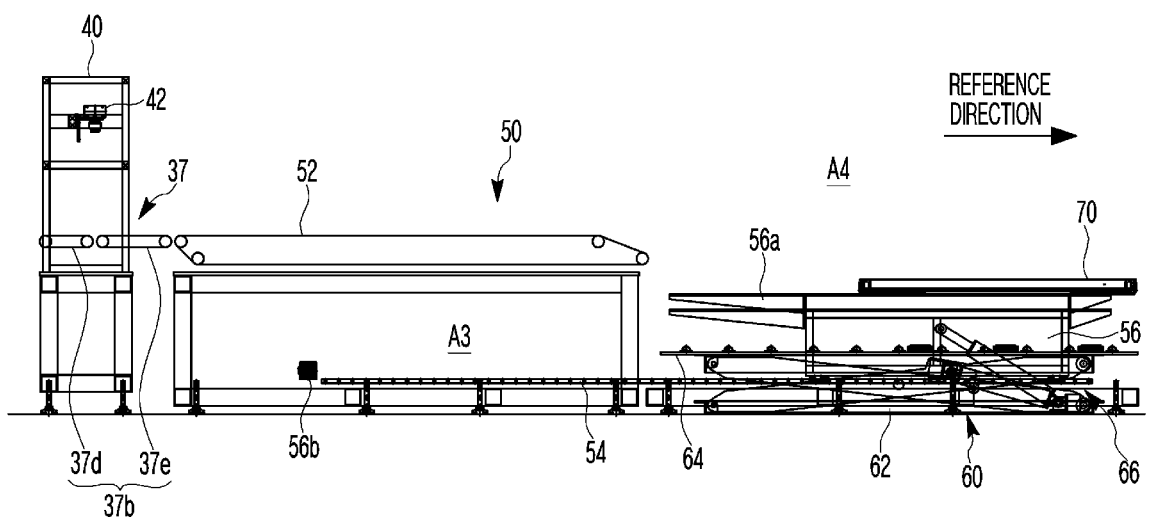

Then, as shown in FIG. 23, the auxiliary bogies 56 may be transferred to the rear space A4 of the discharge conveyer 52 to allow each of the supports 56a to face the lower surface of the film tray 70.

Then, as shown in FIG. 23, the lift 66 may be driven to lower the support plate 64 to position the upper surface of the support plate 64 lower than the upper surface of the supports 56a. Then, both ends of the film tray 70 may be suspended by the supports 56a, and thus the film tray 70 may be separated from the support plate 64 in a process of lowering the support plate 64.

Figure 24:
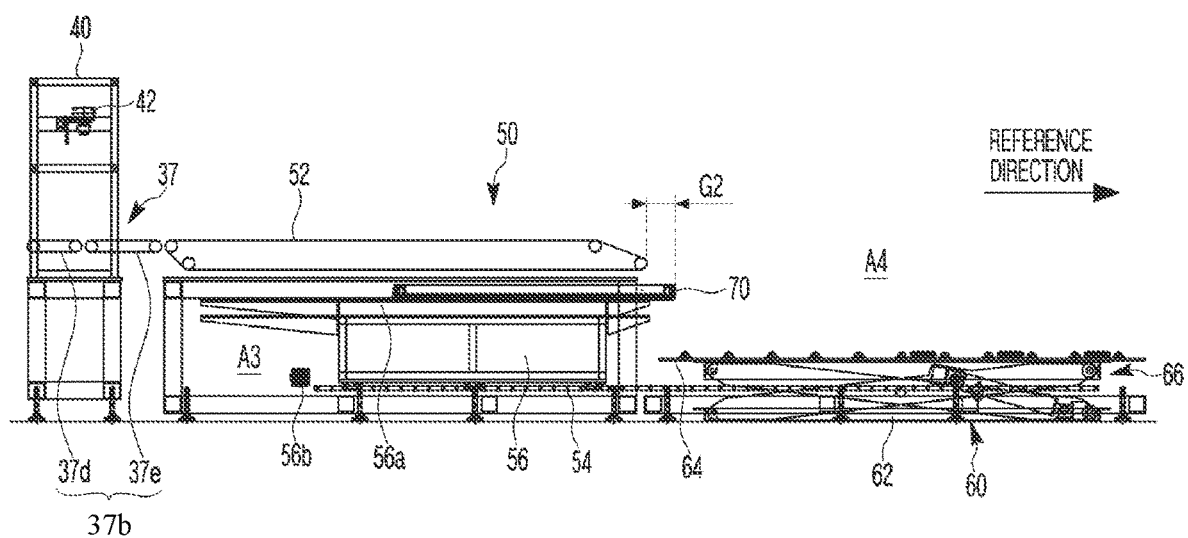

Then, as shown in FIG. 24, the auxiliary bogies 56 may enter the lower space A3 of the discharge conveyer 52 in such a way that the fore-end of the film tray 70 supported by the supports 56a protrudes toward the rear space A4 of the discharge conveyer 52 by a predetermined reference distance G2 compared with the rear-end of the discharge conveyer 52.

Figure 25:
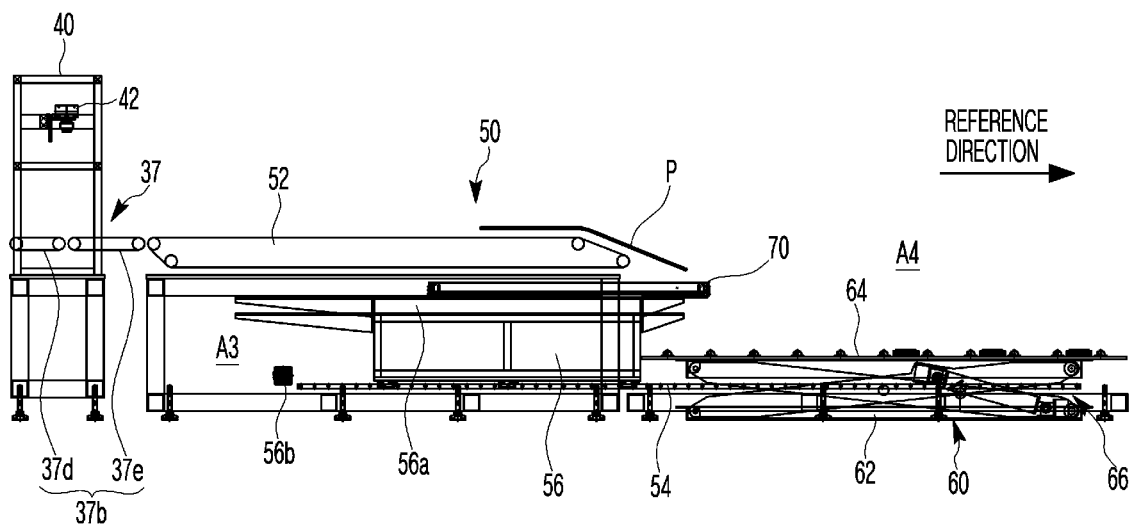

Then, as shown in FIG. 25, when the film product P begins to be discharged from the discharge conveyer 52, the auxiliary bogies 56 may be transferred to the rear space A4 of the discharge conveyer 52 at the same speed as a discharge speed of the film product P.

Figure 26:
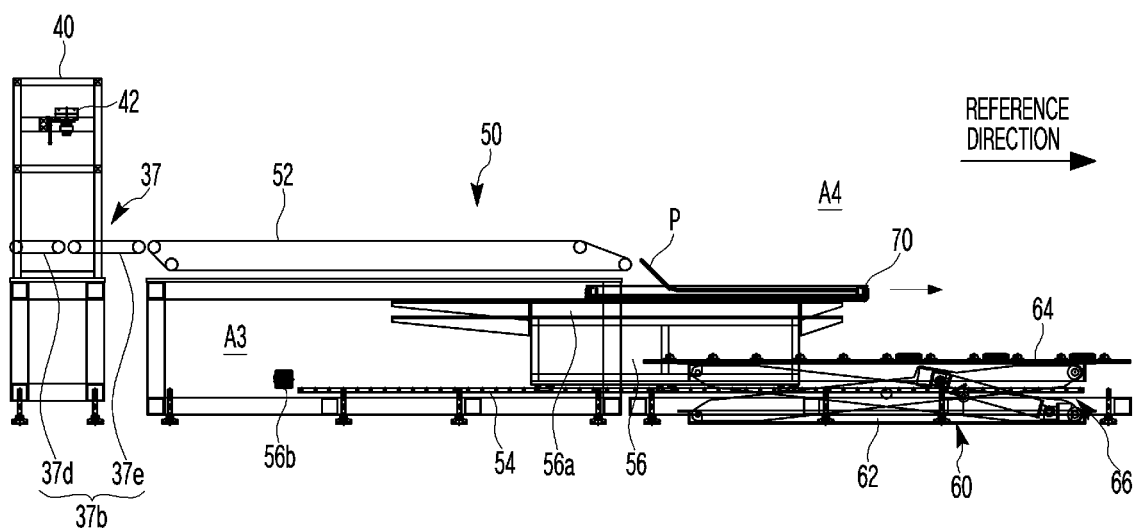
Figure 27:
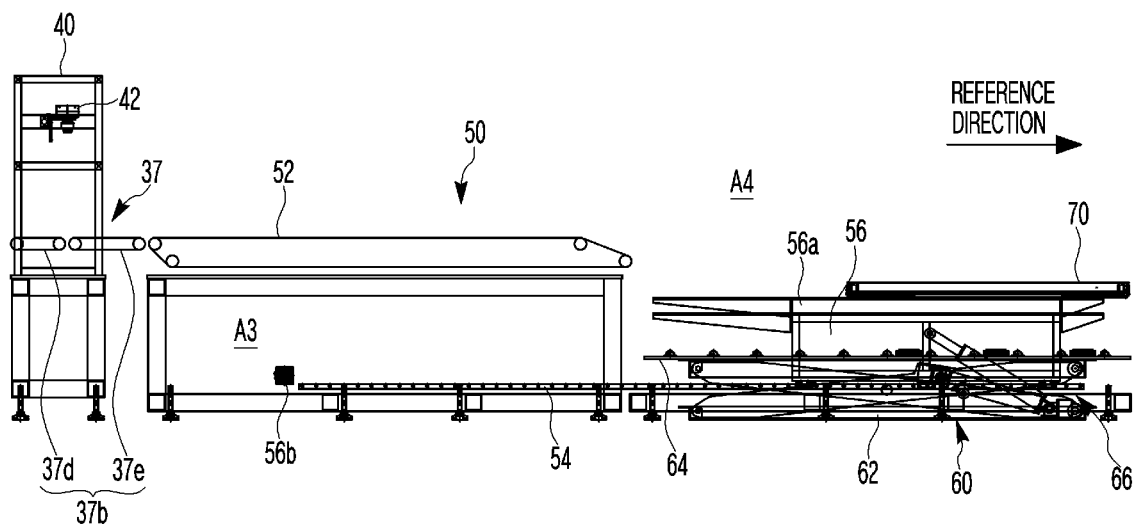

Then, the film tray 70 may be moved at the same speed as the discharge speed of the film product P along the auxiliary bogies 56, and thus a speed difference between the film product P and the film tray 70 may be 'O'. Thus, as shown in FIGS. 25 and 26, the entire region of the film product P discharged from the discharge conveyer 52 is gradually placed on the upper surface of the film tray 70 with a fore-end as a starting point, and thus the entire region may be placed on the film tray 70. Thus, the discharge unit 50 and the loading bogie 60 may prevent pushing, wrinkles, scratches, and other damage from occurring due to frictional force of the film product P from a speed difference between the film product P and the film tray 70. In this case, as shown in FIG. 27, the auxiliary bogies 56 may be transferred to at a position at which the film tray 70 faces the support plate 64 of the loading bogie 60.

Figure 28:
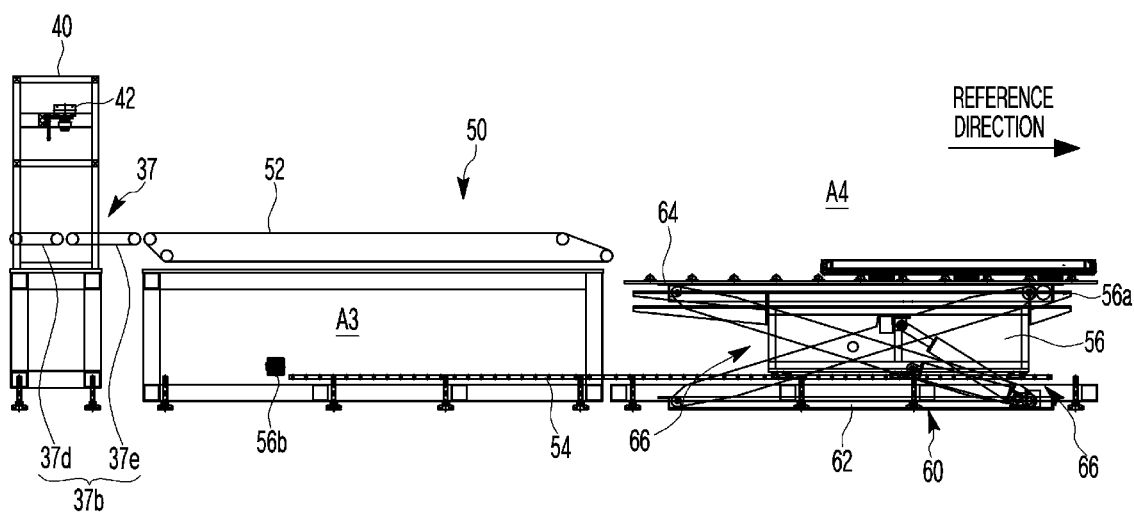

Then, as shown in FIG. 28, the lift 66 may be raised to position the upper surface of the support plate 64 higher than the upper surface of the supports 56a. Then, the film tray 70 may be placed on the support plate 64 raised by the lift 66 and may be raised along the support plate 64, and thus may be separated from the supports 56a.

Figure 29:
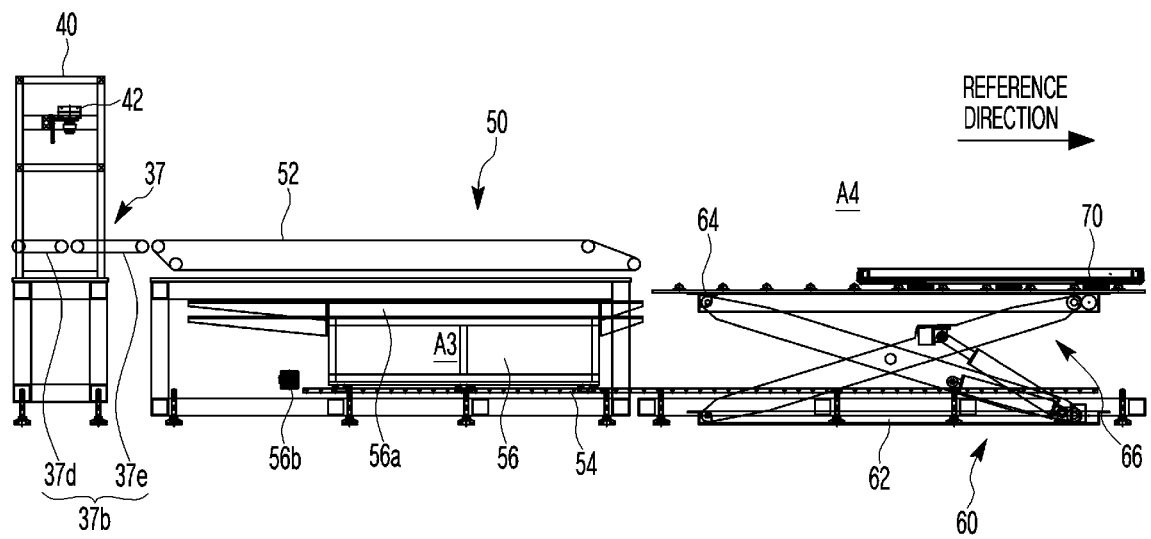

Then, as shown in FIG. 29, the auxiliary bogies 56 may be transferred to the lower space A3 of the discharge conveyer 52.

Then, the loading bogie 60 may be transferred to recover the film product P loaded on the film tray 70 in the state in which the film tray 70 is placed, or only the film tray 70 on which the film product P is placed may be separately transferred to recover the film product P.

The present invention relates to a film processing system and may have the following effects.

First, according to the present invention, an inverter for inverting a film product up and down may be provided to selectively inspect a film product in a non-inverted state or a film product in a vertically inverted state.

Second, according to the present invention, a film product may be inverted up and down in a state of being elastically pressurized by an adhesion belt, and thus the film product may be effectively prevented from being damaged in a process in which the film product is inverted up and down.

Third, according to the present invention, an adhesion belt for inverting a film product up and down may include a plurality of unit belts having a band shape. As such, according to the present invention, the film product may be inverted up and down in a state of being elastically and uniformly pressurized over an entire region by the unit belts, and thus the film product may be more effectively prevented from being damaged in a process of inverting the film product up and down.

Fourth, according to the present invention, a film product discharged from a discharge unit may be loaded on a film tray moved at the same speed as a discharge speed of the film product, and thus the film product may be more effectively prevented from being damaged in a process of loading the film product on the film tray.

The above description is merely illustrative of the technical idea of the present disclosure, and it would be obvious to one of ordinary skill in the art that various modifications and variations can be made without departing from the essential features of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection for the present disclosure should be determined based on the following claims, and all technical ideas falling within the scope of equivalents thereto should be interpreted as being included in the scope of the present disclosure.

What is claimed is:

1. A film processing system comprising:
    a supply unit configured to supply a film fabric;
    a cutting unit configured to cut the film fabric and to form a film product by dividing the film fabric;
    a transfer unit including a classifier configured to selectively guide the film product along any one path of a predetermined non-inverted path and an inverted path, an inverter configured to invert the film product guided along the inverted path up and down, and an inspection transfer device configured to transfer the film product delivered from the classifier in a non-inverted state or the film product delivered from the inverter in an inverted state in a predetermined reference direction; and an inspection unit configured to inspect the film product delivered to the inspection transfer device, wherein the inverter includes:
a bypass conveyer installed to be rotated along a continuous loop and including a conveyer belt configured to transfer the film product delivered from the classifier along the inverted path; and
an inversion member configured to adhere the film product to the conveyer belt to invert the film product up and down while being rotated along a partial section of the continuous loop.

2. The film processing system according to claim 1, wherein the classifier includes a classification conveyer configured to transfer the film product in the predetermined reference direction, and a conveyer rotator configured to adjust a positioning angle of the classification conveyer to selectively guide the film product passing through the classification conveyer along any one path of the non-inverted path and the inverted path.

3. The apparatus film processing system according to claim 2, wherein the conveyer rotator includes an ascending/descending member configured to raise and lower a rear-end of the classification conveyer from which the film product passing through the classification conveyer is discharged by rotating the classification conveyer using a fore-end of the classification conveyer to which the film product is delivered from the supply unit, as a rotation shaft.

4. The apparatus film processing system according to claim 1, wherein the inversion member includes an adhesion belt configured to adhere the film product to the conveyer belt by elastically pressurizing the film product.

5. The apparatus film processing system according to claim 4, wherein the adhesion belt includes a plurality of unit belts having a band shape and arranged at a predetermined interval.

6. The apparatus film processing system according to claim 4, wherein:
the conveyer belt includes a transfer section in which the film product is delivered from the classifier and is moved in the predetermined reference direction, a recovery section that is disposed to be symmetrical with the transfer section and in which the film product is moved in an opposite direction of the predetermined reference direction, a first change section that connects an end point of the transfer section to a starting point of the recovery section and in which a moving direction is changed to the opposite direction from the predetermined reference direction, and a second change section that connects an end point of the recovery section and a start point of the transfer section and in which the moving direction is changed to the predetermined reference direction from the opposite direction; and
the adhesion belt adheres the film product to the first change section to invert the film product up and down and to allow the film product passing through the transfer section to change the moving direction to the opposite direction while moving toward the recovery section from the transfer section along the first change section.

7. The apparatus film processing system according to claim 6, wherein:
the bypass conveyer further includes a first pulley installed at a fore-end and a second pulley installed at a rear-end; and the conveyer belt is wound around outer surfaces of the first pulley and the second pulley to form the continuous loop.

8. The apparatus film processing system according to claim 6, wherein:
the inversion member further includes a driving pulley rotationally driven by a driving motor and a first driven pulley and a second driven pulley that are installed to rotate freely;
a pair of pulleys of the driving pulley, the first driven pulley, and the second driven pulley is installed to position the first change section between the corresponding pair of pulleys; and
the adhesion belt is installed to surround outer circumferences of the driving pulley, the first driven pulley, and the second driven pulley to be rotated along the continuous loop and to allow an adhesion section of a specific portion passing through the pair of pulleys, which is in contact with the first change section, to surround the first change section while being elastically deformed by the first change section.

9. The apparatus film processing system according to claim 8, wherein the driving motor rotationally drives the driving pulley to allow the adhesion belt to be move at the same speed as a moving speed of the conveyer belt.

10. The apparatus film processing system according to claim 8, wherein the inversion member is installed to allow the adhesion section to surround the first change section in a form of a sector with a predetermined arc angle or a semicircle shape.

11. The apparatus film processing system according to claim 6, wherein:
the transfer section is positioned at an upper portion of the conveyer belt;
the recovery section is positioned at a lower portion of the conveyer belt; and
the inspection transfer device is installed in a lower space of the bypass conveyer to deliver the film product discharged from the classifier in the non-inverted state or the film product discharged from the inversion member in the inverted state and includes a two-way conveyor configured to transfer the film product in the predetermined reference direction or the opposite direction.

12. The apparatus film processing system according to claim 11, wherein:
the classifier is provided to transfer the film product in the predetermined reference direction; and
when the film product is guided along the non-inverted path by the classifier, the two-way conveyor is driven to transfer the film product in the predetermined reference direction.

13. The apparatus film processing system according to claim 11, wherein, when the film product begins to be transferred from the inversion member in the opposite direction, the two-way conveyor is driven to transfer the film product in the opposite direction.

14. The apparatus film processing system according to claim 13, wherein, when an entire region of the film product is completely delivered from the inversion member, the two-way conveyor is driven to transfer the film product in the predetermined reference direction.

* * * * *